United States Patent
Lee et al.

(10) Patent No.: US 10,732,338 B2
(45) Date of Patent: Aug. 4, 2020

(54) DISPLAY ASSEMBLY AND DISPLAY APPARATUS USING THE SAME

(71) Applicant: SAMSUNG ELECTRONICS CO., LTD., Suwon-si (KR)

(72) Inventors: Kye Hoon Lee, Suwon-si (KR); Dae Kuen Yang, Suwon-si (KR); Nae-won Jang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 597 days.

(21) Appl. No.: 15/132,854

(22) Filed: Apr. 19, 2016

(65) Prior Publication Data
US 2016/0231495 A1 Aug. 11, 2016

Related U.S. Application Data

(63) Continuation of application No. 14/697,030, filed on Apr. 27, 2015, now Pat. No. 9,348,079.

(30) Foreign Application Priority Data

Jul. 30, 2014 (KR) .................. 10-2014-0097462
Dec. 26, 2014 (KR) .................. 10-2014-0190961

(51) Int. Cl.
*G02B 6/00* (2006.01)
*F21V 8/00* (2006.01)
(Continued)

(52) U.S. Cl.
CPC .............. *G02B 6/0023* (2013.01); *F21K 9/64* (2016.08); *F21V 9/30* (2018.02); *G02B 6/005* (2013.01);
(Continued)

(58) Field of Classification Search
CPC .. G02B 6/0026; G02B 6/0055; G02B 6/0023; G02B 6/0088; G02B 6/0031;
(Continued)

(56) References Cited

U.S. PATENT DOCUMENTS 6,712,481 B2      3/2004  Parker et al.
9,256,023 B2 *    2/2016  Chang .................. G02B 6/0088
(Continued)

FOREIGN PATENT DOCUMENTS

CN       103727458 A     4/2014
CN       103885241 A     6/2014
(Continued)

OTHER PUBLICATIONS

Communication dated Aug. 31, 2016 issued by Chinese Intellectual Property Office in counterpart Chinese Patent Application No. 201510600063.5.
(Continued)

*Primary Examiner* — Y M. Quach Lee
(74) *Attorney, Agent, or Firm* — Sughrue Mion, PLLC

(57) ABSTRACT

The display assembly includes: a light source configured to emit light; a light guide plate disposed to receive light emitted from the light source on a lateral side; and a color transformer disposed proximate to an edge of the light guide plate, and configured to change a color of light incident to the color transformer.

9 Claims, 19 Drawing Sheets

(51) Int. Cl.
  *F21K 9/64* (2016.01)
  *G02F 1/13357* (2006.01)
  *F21V 9/30* (2018.01)

(52) U.S. Cl.
  CPC ......... *G02B 6/0018* (2013.01); *G02B 6/0026* (2013.01); *G02B 6/0031* (2013.01); *G02B 6/0043* (2013.01); *G02B 6/0055* (2013.01); *G02B 6/0088* (2013.01); *G02F 1/133615* (2013.01); *G02F 2001/133614* (2013.01); *G02F 2202/108* (2013.01)

(58) Field of Classification Search
  CPC .... G02B 6/005; G02B 6/0018; G02B 6/0043; F21V 9/30; F21V 9/16; F21V 7/26; F21V 7/22; F21K 9/64; F21K 9/56; G02F 1/133615; G02F 2001/133614; G02F 2202/108
  See application file for complete search history.

(56) References Cited

U.S. PATENT DOCUMENTS

| | | |
|---|---|---|
| 2009/0179548 A1 | 7/2009 | Lai |
| 2012/0188746 A1 | 7/2012 | Lee |
| 2012/0287355 A1* | 11/2012 | Oya ................... G02B 6/0031 362/609 |
| 2013/0128189 A1* | 5/2013 | Hu ..................... G02B 6/0031 362/611 |
| 2014/0036538 A1 | 2/2014 | You et al. |
| 2014/0104877 A1 | 4/2014 | An et al. |
| 2014/0307466 A1 | 10/2014 | Hikmet et al. |
| 2014/0347597 A1 | 11/2014 | Kim et al. |
| 2015/0085522 A1 | 3/2015 | Im et al. |
| 2015/0117052 A1 | 4/2015 | Hsu |
| 2015/0241618 A1* | 8/2015 | Jung .................. G02B 6/0031 362/609 |
| 2015/0331170 A1* | 11/2015 | Cheng et al. ........ G02B 6/0031 362/607 |
| 2015/0355399 A1* | 12/2015 | You ..................... G02B 6/005 362/606 |

FOREIGN PATENT DOCUMENTS

| | | |
|---|---|---|
| CN | 205067912 U | 3/2016 |
| DE | 202010001155 U1 | 5/2010 |
| EP | 2476952 A2 | 7/2012 |
| EP | 2719943 A1 | 4/2014 |
| JP | 10-39280 A | 2/1998 |
| JP | 2002-042525 A | 2/2002 |
| JP | 2004012887 A | 1/2004 |
| JP | 2008-146885 A | 6/2008 |
| JP | 2008-270786 A | 11/2008 |
| JP | 2013-37331 A | 2/2013 |
| JP | 2013-174717 A | 9/2013 |
| JP | 2014-40572 A | 3/2014 |
| KR | 10-2012-0066322 A | 6/2012 |
| KR | 10-2013-0057092 A | 5/2013 |
| KR | 10-2014-0049103 A | 4/2014 |
| WO | 2013/077568 A1 | 5/2013 |

OTHER PUBLICATIONS

Communication dated Oct. 24, 2016 issued by European Patent Office in counterpart European Application No. 16187290.8.
Communication dated May 2, 2017 by the State Intellectual Property Office of P.R. China in counterpart Chinese Patent Application No. 201510600063.5.
Communication dated Apr. 6, 2017 by the European Patent Office in counterpart European Patent Application No. 16187290.8.
Communication dated Jan. 2, 2018, from the State Intellectual Property Office of People's Republic of China in counterpart Application No. 201510458502.3.
Communication dated Nov. 1, 2017, from the State Intellectual Property Office of People's Republic of China in counterpart Application No. 201510600063.5.
Communication dated Jun. 23, 2016 issued by the European Patent Office in counterpart Application No. 15 178 140.8.
Communication dated Jun. 5, 2015, issued by the Korean Intellectual Property Office in counterpart Korean Application No. 10-2014-0190961.
Communication dated Oct. 7, 2015 by the European Patent Office in related Application No. 15178140.8.
Communication dated Nov. 5, 2018 issued by the European Patent Office in Counterpart European Application No. 16 187 290.8.
Communication dated Sep. 26, 2018 issued by the State Intellectual Property Office of P.R. China in Counterpart Chinese Application No. 201510458502.3.
Office Action dated Mar. 21, 2019 by the State Intellectual Property Office of P.R. China in counterpart Chinese Patent Application No. 201510458502.3.
Office Action dated Jan. 29, 2019 by the Japanese Patent Office in counterpart Japanese Patent Application No. 2015-095767.
Communication dated May 21, 2019 issued by the Japanese Patent Office in counterpart Japanese Application No. 2015-095767.
Communication dated Jan. 28, 2020, issued by the Japanese Patent Office in counterpart Japanese Application No. 2015-095767.

* cited by examiner

100k

DISPLAY ASSEMBLY AND DISPLAY APPARATUS USING THE SAME

CROSS-REFERENCE TO RELATED APPLICATION

This application is a continuation of U.S. patent application Ser. No. 14/697,030, filed on Apr. 27, 2015, and claims priority from Korean Patent Application Nos. 10-2014-0097462 and 10-2014-0190961, filed on Jul. 30, 2014 and Dec. 26, 2014, respectively, in the Korean Intellectual Property Office, the disclosures of which are incorporated herein by reference in their entireties.

BACKGROUND

1. Field

One or more exemplary embodiments relate to a display assembly and a display apparatus using the same.

2. Description of the Related Art

A display apparatus converts electrical information into visual information to display the visual information for users. Exemplary embodiments of a display apparatus include a television, a monitor connected to a computer, and various kinds of portable terminals (for example, a smart phone, a tablet computer, and the like).

The display apparatus may include a Cathode Ray Tube (CRT) display, a Light Emitting Diode (LED) display, an Organic Light Emitting Diode (OLED) display, an Active-Matrix Organic Light Emitting Diode (AMOLED) display, a Liquid Crystal Display (LCD), and an Electronic Paper Display (EPD).

The LCD apparatus includes an LCD panel to display images, and a back light unit (BLU) to provide light to the LCD panel.

SUMMARY

Therefore, an aspect of one or more exemplary embodiments is to provide a display assembly which is capable of displaying exact colors according to a user's intention, and a display apparatus using the display assembly.

Additional aspects of one or more exemplary embodiments will be set forth in part in the description which follows and, in part, will be obvious from the description, or may be learned by practice of the disclosure.

In accordance with one or more exemplary embodiments, a display assembly includes: a light source configured to emit light; a light guide plate disposed to receive light emitted from the light source on a lateral side; and a color transformer disposed proximate to an edge of the light guide plate, and configured to change a color of light incident to the color transformer.

The display assembly may further include a first light absorber disposed in contact with the color transformer, and configured to absorb light emitted from the light source.

The first light absorber may be disposed on a lateral side of the color transformer nearest to the light source.

The first light absorber may be disposed on a surface of the color transformer opposite a surface of the color transformer onto which light from the light source is incident.

The display assembly may further include a quantum dot sheet disposed on a top surface of the light guide plate.

The color transformer may be disposed on a surface of the quantum dot sheet that is opposite to the surface of the quantum dot sheet on which the light guide plate is disposed.

The quantum dot sheet and the color transformer may be disposed on a same surface of the light guide plate, and the color transformer may be disposed alongside the quantum dot sheet.

The display assembly may further include: a housing; and a first fixing part protruding from the housing toward the quantum dot sheet, and configured to secure the quantum dot sheet in the housing.

The color transformer may be disposed on a surface of the first fixing part that faces toward the light guide plate.

The first fixing part and the color transformer may contact one surface of the quantum dot sheet.

The color transformer may contact the light guide plate, and the first fixing part may contact the quantum dot sheet.

An alignment groove may be formed in one surface of the first fixing part, and the color transformer may be rested in the alignment groove.

The display assembly may further include an optical sheet disposed on a surface of the quantum dot sheet that is opposite to the surface of the quantum dot sheet contacting the light guide plate.

The display assembly may further include a display panel disposed on a surface of the optical sheet that is opposite to the surface of the optical sheet contacting the quantum dot sheet.

The display assembly may further include: a housing; and a second fixing part protruding from the housing toward the display panel, and configured to contact the display panel to secure the display panel in the housing.

The display assembly may further include: a housing; and a color transformer installing part protruding from the housing toward the light guide plate, wherein the color transformer is disposed on a surface of the color transformer installing part facing toward the light guide plate, and the color transformer contacts the light guide plate.

A portion of the color transformer may be disposed on an edge of one surface of the light guide plate.

The display assembly may further include a reflector disposed on a bottom surface of the light guide plate that is opposite to the surface of the light guide plate on which the color transformer is disposed, the reflector being configured to reflect incident light to the inside of the light guide plate.

The reflector may extend adjacent to the light source.

The display assembly may further include a second light absorber disposed adjacent to one edge of the reflector, and configured to absorb incident light.

The second light absorber may include a black material.

The display assembly may further include an auxiliary reflector configured to reflect light emitted from the light source toward the light guide plate or the color transformer.

The auxiliary reflector may include a white material.

The light source may be configured to emit light of a bluish color.

The color transformer may include a yellow fluorescent material.

The display assembly may further include a light leakage preventer configured to prevent leakage of light emitted from the light source.

The light leakage preventer may be disposed between at least one of the quantum dot sheet, the light guide plate, and a first fixing part protruding toward the quantum dot sheet and configured to secure the quantum dot sheet in the housing.

The light leakage preventer may be disposed in contact with at least one of the quantum dot sheet and the light guide plate through a stepwise structure.

The light leakage preventer may include sponge.

In accordance with another aspect of one or more exemplary embodiments, a display apparatus includes: a light source configured to emit light; a light guide plate disposed to receive light emitted from the light source is incident on a lateral side thereof; and a color transforming element disposed on an edge of a surface of the light guide plate, and configured to change a color of light emitted from the light source.

In accordance with another aspect of one or more exemplary embodiments, a display apparatus includes: a light source configured to emit source light; a color transformer disposed to receive a portion of the source light emitted from the light source, the color transformer being configured to alter a wavelength of the portion of the received source light and to emit the altered light; a light guide plate configured to receive another portion of the source light; and a display panel configured to transmit the source light and the altered light towards an outside of the display apparatus.

The display panel may include a gap at a portion of the display panel. When the display panel transmits the light, a wavelength of light transmitted through the gap may be changed. The color transformer may be configured to alter the wavelength of the received portion of the source light inversely to the changes to the wavelength of light transmitted through the gap.

The display apparatus may be configured so that the altered light is to be transmitted through the portion display corresponding to the location of the gap.

The gap is disposed may be proximate to an edge portion of the display panel.

The light source may be configured to emit light having a wavelength corresponding to a blue color. When the display panel transmits the light, the wavelength of light transmitted through the gap may be changed to correspond to a more blue color. The color transformer may be configured to alter the wavelength of the received portion of the source light to correspond to a more yellow color.

BRIEF DESCRIPTION OF THE DRAWINGS

These and/or other aspects of one or more exemplary embodiments will become apparent and more readily appreciated from the following description, taken in conjunction with the accompanying drawings of which.

DETAILED DESCRIPTION

Figure 1:
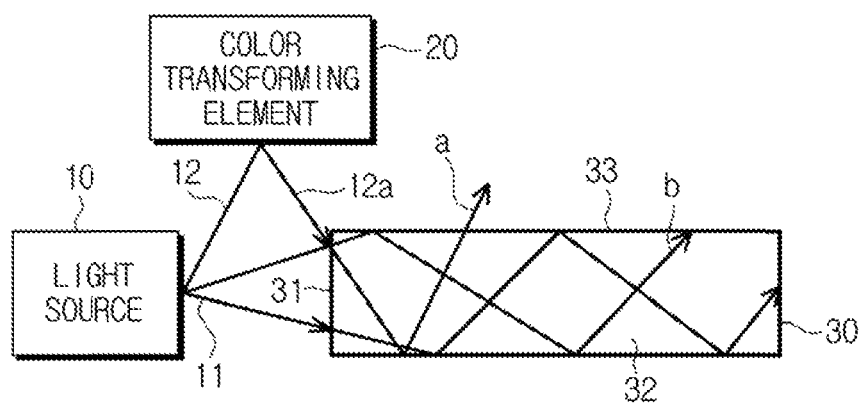
FIG. 1 illustrates a display assembly according to an exemplary embodiment.

Reference will now be made in detail to one or more exemplary embodiments, examples of which are illustrated in the accompanying drawings, wherein like reference numerals refer to like elements throughout.

Hereinafter, display assemblies according to various exemplary embodiments will be described with reference to FIGS. 1 to 19.

FIG. 1 illustrates a display assembly according to an exemplary embodiment.

As shown in FIG. 1, a display assembly 1 may include a light source 10 to emit, or irradiate, light 11, a color transforming element 20 to change a color of a part 12 of light emitted from the light source 10, and a light guide plate 30 to receive light emitted from the light source 10 through at least one surface.

The light source 10 may emit white light or light of a predetermined color. The light source 10 may be one of various kinds of lighting devices capable of emitting light. For example, the light source 10 may be a Cold Cathode Fluorescent Lamp (CCFL) or a Light Emitting Diode (LED). However, the light source 10 may be one of various kinds of lighting devices that can be considered by a person of ordinary skill in the art.

Light emitted from the light source 10 may travel to the color transforming element 20 or the light guide plate 30.

The entire or a part of light emitted from the light source 10 may be transferred to the light guide plate 30 and then enter the inside 32 of the light guide plate 30. According to an exemplary embodiment, light emitted from the light source 10 may enter the inside 32 of the light guide plate 30 through one surface of the light guide plate 30. The light inside 32 the light guide plate 30 may be reflected one or more times in the inside 32 of the light guide plate 30 and then emitted in a direction different from the light source 10. The entire or a part (for example, a and b) of light that is reflected in the inside 32 of the light guide plate 30 may be emitted uniformly in some degree from the upper surface 33 of the light guide plate 300.

The entire or a part of light emitted from the light source 10 may be incident to the color transforming element 20. In the following description, light that is incident to the color transforming element 20 is referred to as incident light 12, and light that exits the color transforming element 20 corresponding to the incident light 12 is referred to as exit light 12a. The color transforming element 20 may receive the incident light 12 emitted from the light source 10, and emit the exit light 12a corresponding to the incident light 12. The color transforming element 20 may respond to the incident light 12 emitted from the light source 10, and emit the exit light 12a corresponding to the incident light 12. The exit light 12a may be incident to the surface 31 of the light guide plate 30 entering into the light guide plate 30. However, a part of the exit light 12a emitted from the color transforming element 20 may be not enter the light guide plate 30.

The exit light 12a exiting the color transforming element 20 may have a color that is different from that of the incident light 12. In other words, the color transforming element 20 may change the color of the incident light 12, and emit the exit light 12a with the changed color. For example, when the incident light 12 is bluish light, the color transforming element 20 may emit yellowish exit light 12a. Accordingly, the light 12a that exits the color transforming element 20 and then enters into the inside 32 of the light guide plate 30 may have a color that is different from that of the light 11 that is incident directly from the light source 10 to the surface 31 of the light guide plate 30.

Also, the light a and b exiting the inside 32 of the light guide plate 30 may have different colors according to the color of the corresponding incident light 11 and 12a. More specifically, the light a exiting the inside 32 of the light guide plate 30 at a location adjacent to the light source 10 may have a color changed by the color transforming element 20, and the light b exiting the inside 32 of the light guide plate 30 at a location distant from the light source 10 may have the same color as that of the light 11 emitted from the light source 10. For example, if the light source 10 emits bluish light and the color transforming element 20 changes the bluish light to yellowish light, the light a exiting the inside 32 of the light guide plate 30 at a location adjacent to the light source 10 may be the yellowish light, and the light b exiting the inside 32 of the light guide plate 30 at a location distant from the light source 10 may be the bluish light.

According to an exemplary embodiment, one or more panels may be mounted on a surface of the light guide plate 30. The one or more panels may be mounted on the upper surface 33 of the light guide plate 30 which the light a and b exits. The one or more panels may output light of predetermined colors according to the color of the light a and b exiting the light guide plate 30. The one or more panels may be an optical sheet or a quantum dot sheet.

Hereinafter, an exemplary embodiment of a display apparatus 100 to which the display assembly 1 including the light source 10, the color transforming element 20, and the light guide plate 30 as described above is applied will be described.

Figure 2:
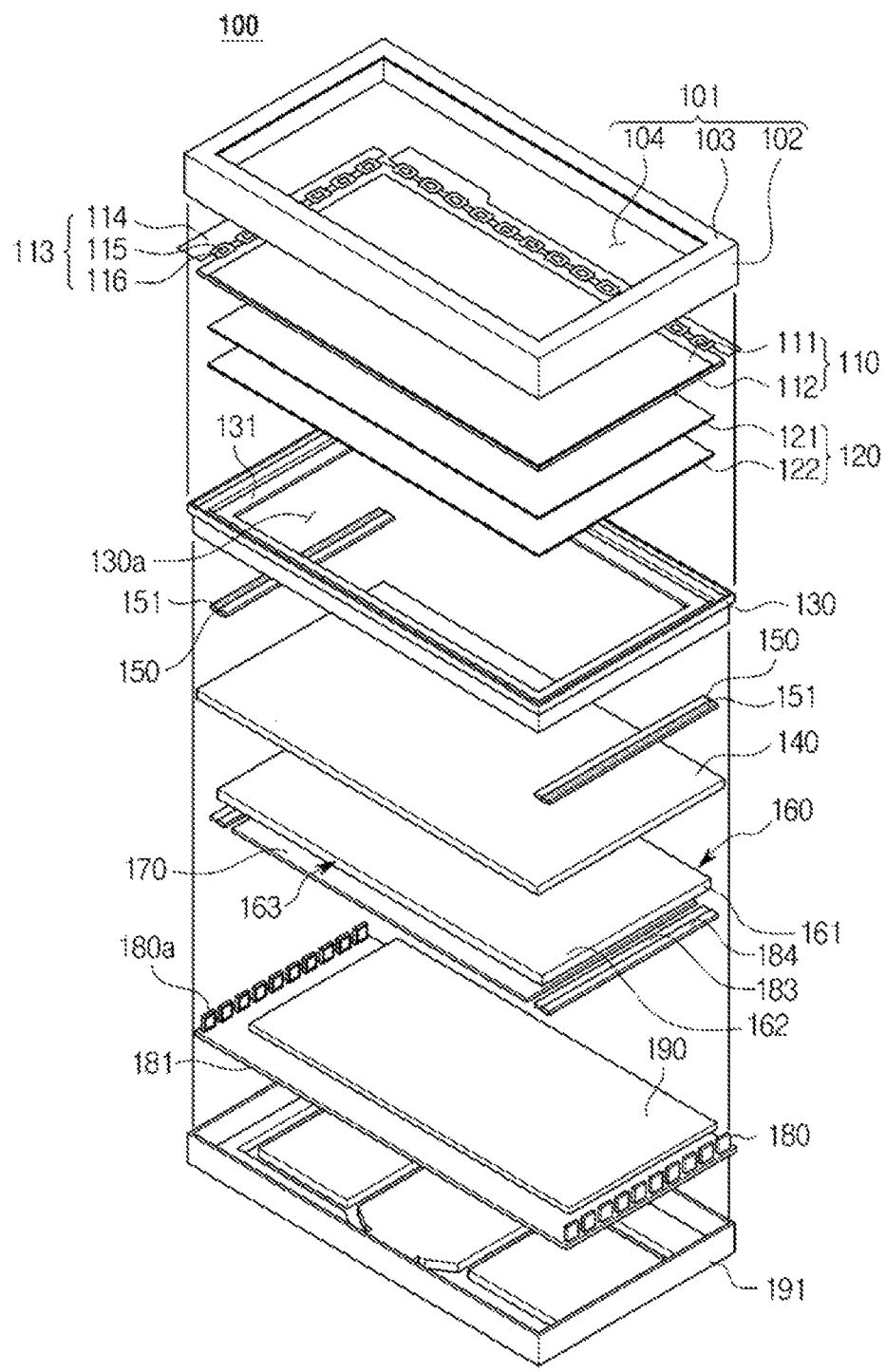
FIG. 2 is an exploded perspective view of a display apparatus according to an exemplary embodiment.

FIG. 2 is an exploded perspective view of a display apparatus according to an exemplary embodiment.

Referring to FIG. 2, a display apparatus 100 may include an upper housing 101, a display panel 110, an optical sheet 120, a middle housing 130, a quantum dot sheet 140, a color transforming element 150, i.e., a color transformer, a light guide plate 160, a reflector 170, a Printed Circuit Board (PCB) 181, and a lower housing 191. However, one or more of the aforementioned components may be altered or omitted and additional components may be added according to one or more exemplary embodiments.

The upper housing 101 may be disposed on the display panel 110 to form a front of the display apparatus 100. The upper housing 101 may enable various elements of the display apparatus 100 to be installed within the display apparatus 100. Also, the upper housing 101 may protect various elements of the display panel 110 from external impact, while securing the display panel 110 within the display apparatus 100.

The upper housing 101 may include a second fixing part 103 forming a bezel, and an upper housing side part 102 extending from the edges of the second fixing part 103 toward the lower housing 191. In the front part of the upper housing 101, an opening 104 may be formed so that a display area of the display panel 110 can be exposed to the outside.

The second fixing part 103, i.e., a second securer, may protrude toward the opening 104 to prevent the display panel 110 from being separated from the display apparatus 100. In other word, the second fixing part 103 may protrude toward the display panel 110 so that the second fixing part 103 secures the display panel 110, when the upper housing 101 is coupled with the display panel 110.

The upper housing side part 102 may secure various elements of the display panel 110 inside the display apparatus 100. Also, the upper housing side part 102 may protect the various elements of the display panel 110 against external impact applied from the side.

The opening 104 may expose a display area of the display panel 110 to the outside so that a user can see images through the display area of the display panel 110.

The display panel 110 may receive light supplied through the optical sheet 120, and display an image. One surface of the display panel 110 may be exposed to the outside by the opening 104.

The display panel 110 may be a Liquid Crystal Display (LCD). The LCD may adjust an alignment of a liquid crystal layer installed in a panel to refract light into different patterns to display various images for a user.

According to an exemplary embodiment, the display panel 110 may further include a thin film transistor board 111 on which a plurality of thin film transistors are arranged, and a color display board 112. The liquid crystal layer may be provided between the thin film transistor board 111 and the color display board 112.

The thin film transistor board 111 and the color display board 112 may be spaced a predetermined distance apart from each other. A color filter and a black matrix may be provided on the color display board 112. On the thin film transistor board 111, a driver 113 for applying a driving signal to the thin film transistor board 111 may be mounted. The driver 113 may include a first board 114, a plurality of driving chips 115 connected to the first board 114, and a second board 116 on which the driving chips 115 are mounted. The second board 116 may be a Flexible Printed Circuit Board (FPCB).

However, a person of ordinary skill in the art would know alternate panels capable of being used as the display panel 110.

The display panel 110 may further include a touch panel that detects a touch operation and includes a polyester film or glass to, or a polarizing plate to polarize light emitted through the display panel 110. The touch panel or the polarizing plate may be mounted on one surface of the display panel 110, such as the surface of the display panel 110 corresponding to the display area of the display panel 110 exposed to the outside through the opening 104.

The optical sheet 120 may be mounted on the other surface of the display panel 110 that is opposite to the surface of the display panel 110 exposed to the outside. The optical sheet 120 may include a protection film 121 and a prism film 122. The prism film 122 may refract light diffused by the quantum dot sheet 140 to cause the light to be incident vertically to the display panel 110. On one surface of the prism film 122, a plurality of prisms may be arranged in a predetermined pattern. The protection film 121 may be positioned above the prism film 122 closer to the display panel 110 than the prism film 122, and protect the prism film 122 from external stimulus or foreign materials. However, according to one or more exemplary embodiments, at least one of the protection film 121 and the prism film 122 may be omitted.

The middle housing 130 may include a first fixing part 131 protruding in the inside direction. The first fixing part 131 may define an opening 130a through which light exiting the quantum dot sheet 140 passes. The optical sheet 120 may be placed on the first fixing part 131, i.e., a first securer, wherein a part of the optical sheet 120 may be blocked from the quantum dot sheet 140 by the first fixing part 131, and the other part of the optical sheet 120 may face the quantum dot sheet 140 through the opening 130.

According to an exemplary embodiment, the middle housing 130 may contact or be disposed adjacent to the quantum dot sheet 140 to secure the quantum dot sheet 140.

According to another exemplary embodiment, the middle housing 130 may contact or be disposed adjacent to the light guide plate 160 to secure the light guide plate 160.

According to a still another exemplary embodiment, the middle housing 130 may secure both the quantum dot sheet 140 and the light guide plate 160.

Below the middle housing 130, the color transforming element 150 may be provided. The color transforming element 150 may be placed on one surface of the first fixing part 131 of the middle housing 130, or in a color transforming element installation part provided in the middle housing 130.

The quantum dot sheet 140 may transfer light exiting the light guide plate 160 to the optical sheet 120. The optical sheet 120 may be between quantum dot sheet 140 and the display panel 110. A predetermined gap may be formed between the quantum dot sheet 140 and the optical sheet 120. Light exiting the quantum dot sheet 140 may be reflected one or more times in the gap between the quantum dot sheet 140 and the optical sheet 120.

The quantum dot sheet 140 may selectively change a wavelength of light exiting the light guide plate 160 to change a color of the light. In the quantum dot sheet 140, a plurality of quantum dots may be distributed to convert light of a predetermined wavelength into light of another wavelength. The quantum dots may change light of a predetermined color to light of another color. As a non-limiting example, a light source 180 emits bluish light, the quantum dots may change bluish light to greenish light or reddish light.

Whenever light is reflected in the gap between the quantum dot sheet 140 and the optical sheet 120, the color of the reflected light may be changed by the quantum dots. More specifically, whenever light is reflected in the gap, the color of the light may change from blue to green and then from green to red. The quantum dot sheet 140 may change a wavelength of light exiting the light guide plate 160 to change a color of the light, as described above. The light with the changed color may be emitted toward the optical sheet 120.

The color transforming element 150 may emit exit light of a color that is different from that of incident light emitted from the light source 180. The color transforming element 150 may change the color of the incident light while the incident light is reflected or transmitted.

The color transforming element 150 may change the wavelength of the incident light to emit exit light of a color that is different from that of the incident light. The color transforming element 150 may emit light of a color that is different from that of the incident light. According to an exemplary embodiment, the color transforming element 150 may emit exit light of a wavelength that is longer than that of the incident light. For example, the color transforming element 150 may change bluish incident light of a short wavelength to yellowish exit light of a long wavelength.

Since light of different colors can be emitted by the color transforming element 150, various colored light may be incident to the light guide plate 160. More specifically, the color of light exiting the color transforming element 150 and incident to the light guide plate 160 may be different from the color of light emitted from the light source 180 and directly incident to the light guide plate 160. For example, the color of light exiting the color transforming element 150 and incident to the light guide plate 160 may be a yellowish color, and the color of light emitted from the light source 180 and directly incident to the incident surface 161 of the light guide plate 160 may be a bluish color.

The light exiting the color transforming element 150 may be incident to at least one of the light guide plate 160 and the quantum dot sheet 140. The light exiting the color transforming element 150 may be incident directly to the light guide plate 160 or the quantum dot sheet 140, or indirectly to the light guide plate 160 or the quantum dot sheet 140 via another element such as the reflector 170. The light exiting the color transforming element 150 may be incident mainly to the light guide plate 160, according to the position of the color transforming element 150 or a shape of an area in which the color transforming element 150 is positioned.

The color transforming element 150 may include a fluorescent material. If the light source 180 emits bluish light, the color transforming element 150 may include a yellow fluorescent material. Also, the color transforming element 150 may include a fluorescent material that can be applied on the middle housing 130, or a fluorescent strip that is a strip dyed by a fluorescent material. The fluorescent material may be a yellow fluorescent material. The fluorescent material may be a transition-metal compound or a rare-earth compound. The fluorescent material may be coal oil, lead glass, platinocyanide, or a zinc sulfide phosphor (for example, ZnS, ZnS:Min, ZnS:Cu).

According to an exemplary embodiment, the color transforming element 150 may further include a first light absorbing element 151, i.e., a first light absorber, that extends alongside the color transforming element 150. The first light absorbing element 151 may absorb a part of the light emitted from the light source 180.

According to an exemplary embodiment, an auxiliary reflector (see 182 of FIG. 11) may be further provided alongside the color transforming element 150. The auxiliary reflector 182 may be spaced a predetermined distance apart from the color transforming element 150.

The light guide plate 160 may reflect light emitted from the light source 180 one or more times to supply the light emitted from the light source 180 uniformly to the quantum dot sheet 140. The light guide plate 160 may include the incident surface 161 corresponding to the lateral side of the light guide plate 160 that receives light emitted from the light source 180, an exit surface 162 facing the quantum dot sheet 140, and a reflective surface 163 opposite the exit surface 162. Light exiting the color transforming element 150 may be incident to the incident surface 161 of the light guide plate 160. Light emitted from the light source 180 or exiting the color transforming element 150 may be incident to the exit surface 162 of the light guide plate 160.

According to an exemplary embodiment, the light guide plate 160 may be made of a synthetic resin, such as Poly Methyl Methacrylate (PMMA) or Poly Methylstrene. However, the light guide plate 160 may be made of another material that can be considered by a person of ordinary skill in the art.

The reflector 170 may be further attached on the reflective surface 163 of the light guide plate 160. The reflector 170 may reflect light exiting the reflective surface 163 of the light guide plate 160 to the inside of the light guide plate 160. The reflector 170 may extend longer than the borders of the light guide plate 160. According to an exemplary embodiment, the reflector 170 may extend adjacent to the light source 180 and protrude from beneath the light guide plate 160.

The reflector 170 may be made of a synthetic resin, such as Polyethylene Terephthalate (PET) or Polycarbonate (PC). However, the reflector 170 may be made of another material that can be considered by a person of ordinary skill in the art.

According to an exemplary embodiment, a second light absorbing element 183, i.e., a second light absorber, may be further provided along the edge of the reflector 170. The second light absorbing element 183 may absorb light emitted from the light source 180, light reflected from the color transforming element 150, or light reflected in a space defined by the middle housing 130.

According to another exemplary embodiment, an auxiliary reflector 184 to reflect incident light may be further provided along the edge of the reflector 170.

According to an exemplary embodiment, both the second light absorbing element 183 and the auxiliary reflector 184 may be provided along the edge of the reflector 170.

A PCB 181 and a spacer 190 may be provided on the other surface of the surface of the reflector 170 on which the light guide plate 160 is attached.

The spacer 190 may be interposed between the PCB 181 and the reflector 170. The spacer 190 may be positioned on one surface of the PCB 181 to prevent various elements protruding in one direction from directly contacting the reflector 170 so that the elements and the reflector 170 are not damaged. The spacer 190 may be in the shape of a flat plate to correspond to the shape of the reflector 170. Also, the spacer 190 may be a plate made of silicon or the like. However, the spacer 190 may be made of another material that can be considered by a person of ordinary skill in the art. Also, the spacer 190 may be omitted.

The PCB 181 may apply an electrical signal to the light source 180 mounted on the PCB 181 to enable the light source 180 to emit light. Various elements to control emission of the light source 180 may be mounted on the PCB 181. The various elements may include one or more semiconductor chips including a processor or a storage unit, i.e., a storage or a memory. On the PCB 181, a processor for controlling various elements such as the display panel 110 as well as the light source 180 may be mounted.

The light source 180 may be mounted on the PCB 181. According to an exemplary embodiment, a plurality of light sources 180 and 180a may be mounted on one or more edges of the PCB 181, and emit light toward the light guide plate 160. The color of the light may be predetermined. When the plurality of light sources 180 and 180a are mounted on two edges of the PCB 181, the plurality of light sources 180 may be mounted on an edge of the PCB 181 opposite to edge of the PCB 181 on which the plurality of light sources 180a are mounted. The light sources 180 and 180a may be mounted on the PCB 181 in such a way to contact the PCB 181, as necessary. However, according to another exemplary embodiment, the light sources 180 and 180a may be mounted on a portion formed on the PCB 181.

The light sources 180 and 180a may emit light of a predetermined color in all directions. The predetermined color of light that is emitted from the light sources 180 and 180a may be blue. The light that is emitted in all directions may be reflected by the reflector 170, the auxiliary reflector 184, etc., and then incident to the light guide plate 160. Also, the emitted light may arrive at the color transforming element 150. The color transforming element 150 may emit light corresponding to the light emitted from the light sources 180 and 180a, as described above. The light sources 180 and 180a may be CCFLs or LEDs. However, the light sources 180 and 180a may be various kinds of lighting devices as would be considered by a person of ordinary skill in the art.

The lower housing 191 may be connected to at least one of the upper housing 101 and the middle housing 130 to form an external structure of the display apparatus 100. In the internal space defined by the upper housing 101 and the lower housing 191, the display panel 110, the optical sheet 120, the middle housing 130, the quantum dot sheet 140, the color transforming element 150, the light guide plate 160, the reflector 170, or the PCB 181 may be installed. In the lower housing 191, the PCB 181 on which the light source 180 is mounted may be secured and installed.

At least two of the upper housing 101, the middle housing 130, and the lower housing 191 may be integrated into one body. For example, the middle housing 130 may be a portion of the lower housing 191 or a portion of the upper housing 101.

In one or more exemplary embodiments, one or more of the described elements may be removed or changed, and additional elements may be added.

Hereinafter, a display apparatus according to a first exemplary embodiment will be described.

Figure 3:
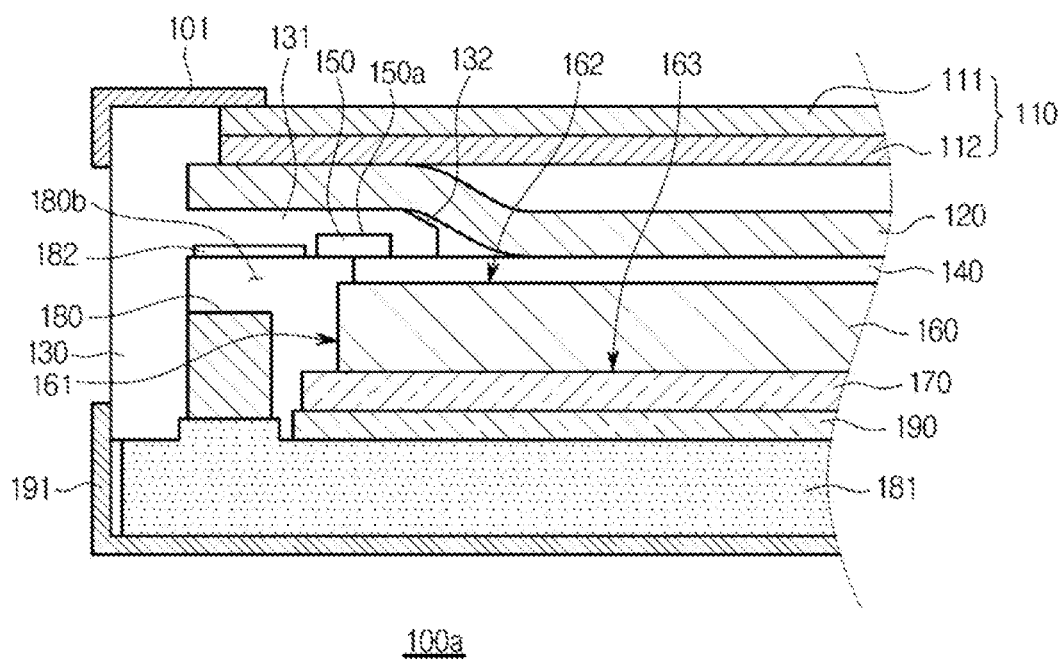
FIG. 3 is a cross-sectional view of a display apparatus according to a first exemplary embodiment.

FIG. 3 is a cross-sectional view of a display apparatus according to a first exemplary embodiment.

Referring to FIG. 3, a display apparatus 100a may include a display panel 110, an optical sheet 120 disposed below the display panel 110, a quantum dot sheet 140 disposed below the optical sheet 120, a light guide plate 160 disposed below the quantum dot sheet 140, a reflector 170 attached to a reflective surface 163 of the light guide plate 160, a PCB 181 positioned below the reflector 170, a spacer 190 provided to separate the reflector 170 from the PCB 181, a light source 180 mounted on the PCB 181, a first fixing part 131 contacting the quantum dot sheet 140 to secure the quantum dot sheet 140, a middle housing 130, a color transforming element 150 disposed below the first fixing part 131, and an upper housing 101 to secure the display panel 110. However, one or more of the aforementioned components may be omitted according to various exemplary embodiments.

The display panel 110 may be an LCD panel including a thin film transistor board 111 and a color change board 112. However, the display panel 110 may be one of other various kinds of display panels.

The optical sheet 120 may include a plurality of films, and transfer light exiting the quantum dot sheet 140 to the display panel 110. Between the optical sheet 120 and the quantum dot sheet 140, a gap or an air gap may be formed.

The quantum dot sheet 140 may receive light exiting the light guide plate 160, and change a wavelength of the received light to thus selectively change a color of the light. In the quantum dot sheet 140, a plurality of quantum dots may be distributed to change the color of light.

The light guide plate 160 may have an incident surface 161 facing the light source 180, and light emitted from the light source 180 or exiting the color transforming element 150 may be incident to the incident surface 161 of the light guide plate 160. The light emitted from the light source 180 or the light exiting the color transforming element 150 may also enter the light guide plate 160 through an exit surface 162 of the light guide plate 160. The incident light may be reflected one or more times inside of the light guide plate 160, and transmitted in a predetermined direction. The incident light transmitted in the predetermined direction in the light guide plate 160 may be emitted toward the quantum dot sheet 140 through the exit surface 162. In this way, the light guide plate 160 may enable light emitted from the light source 180 or exiting the color transforming element 150 to be more uniformly supplied to the quantum dot sheet 140 facing the exit surface 162 of the light guide plate 160. The light guide plate 160 may be made of a synthetic resin, such as PMMA or Poly Methylstrene.

The reflector 170 may be disposed below the reflective surface 163 of the light guide plate 160. The reflective surface 163 may be opposite to the exit surface 162 of the light guide plate 160. The reflector 170 may reflect light from the reflective surface 163 back into the light guide plate 160. As shown in FIG. 3, the reflector 170 may extend adjacent to the light source 180. Accordingly, the reflector 170 may reflect a part of light emitted from the light source 180 toward the incident surface 161 of the light guide plate 160 so that the light can be incident to the incident surface 161. The reflector 170 may be made of PET or PC.

The light source 180 may emit light of a predetermined color. Light emitted from the light source 180 may be red light or blue light. The light source 180 may emit light of various colors. A part of light emitted from the light source 180 may directly arrive at the incident surface 161 of the light guide plate 160, or may be reflected by the reflector 170 or the auxiliary reflector 182 and then arrive at the incident surface 161 of the light guide plate 160. Also, a part of light emitted from the light source 180 may arrive at the color transforming element 150. In this case, the part of the light may stimulate the color transforming element 150 so that the color transforming element 150 can emit light of a different color. The light source 180 may be an LED.

The light source 180 may be mounted on the PCB 181. On the PCB 181, a semiconductor chip and a circuit for controlling light emission of the light source 180 may be mounted. The PCB 181 may control various operations of the display apparatus 100a.

The spacer 190 may be interposed between the PCB 181 and the reflector 170 to prevent elements mounted on the PCB 181 and the reflector 170 from being damaged. The spacer 190 may have a shape corresponding to the PCB 181 or the reflector 170. The spacer 190 may be made of silicon or the like.

As shown in FIG. 3, the first fixing part 131 may protrude toward the optical sheet 120 and the quantum dot sheet 140 in the middle housing 130. On the upper surface of the first fixing part 131, the optical sheet 120 may be disposed. Below the lower surface of the first fixing part 131, the quantum dot sheet 140 may be disposed. The upper surface of the first fixing part 131 may face the lower surface of the optical sheet 120, and the lower surface of the first fixing part 131 may face the upper surface of the quantum dot sheet 140. In other words, the first fixing part 131 may be provided in such a way as to be inserted between the optical sheet 120 and the quantum dot sheet 140. The first fixing part 131 may contact the optical sheet 120 or the quantum dot sheet 140, or may be attached to the optical sheet 120 or the quantum dot sheet 140 as necessary.

The optical sheet 120 may be disposed on the upper surface of the first fixing part 131 and the upper surface of the quantum dot sheet 140. Along the edge of the first fixing part 131, a cutting surface 132 cut at a predetermined angle may be further formed in order to more easily install the optical sheet 120 and prevent the optical sheet 120 from being damaged. By forming the cutting surface 132, it is possible to prevent the optical sheet 120 from being worn due to friction of the edge of the first fixing part 131 and the optical sheet 120.

Below the first fixing part 131, the color transforming element 150 may be disposed. In order to more easily install the color transforming element 150, an alignment groove 150a may be formed in the lower surface of the first fixing part 131. The alignment groove 150a may be caved in from the lower surface of the first fixing part 131 toward the upper surface. The alignment groove 150a may be formed by insertion of the color transforming element 150. According to another exemplary embodiment, the alignment groove 150a may be omitted.

One surface of the color transforming element 150 may contact the quantum dot sheet 140, and the other surface of the color transforming element 150 may contact the lower surface of the first fixing part 131 or the inner surface of the alignment groove 150a formed in the lower surface of the first fixing part 131. Accordingly, one surface of the quantum dot sheet 140 may contact the light guide plate 160, and the other surface of the quantum dot sheet 140 which is opposite to the surface of the quantum dot sheet 140 contacting the light guide plate 160 may contact the color transforming element 150. According to an exemplary embodiment, the entire surface of the color transforming element 150 may contact the quantum dot sheet 140. According to another exemplary embodiment, a part of the color transforming element 150 may contact the quantum dot sheet 140, and the other part of the color transforming element 150 may be exposed to a space 180b in which the light source 180 is installed, without contacting the quantum dot sheet 140.

The color transforming element 150 may emit exit light of a color that is different from that of incident light, as described above. According to an exemplary embodiment, the color transforming element 150 may include a fluorescent material.

Below the first fixing part 131, an auxiliary reflector 182 may be provided. The auxiliary reflector 182 may reflect light emitted from the light source 180 and not heading toward the light guide plate 160 directly or the reflector 170. Accordingly, the auxiliary reflector 182 may prevent leakage of light emitted from the light source 180, thereby increasing optical efficiency. The auxiliary reflector 182 may be disposed alongside the color transforming element 150.

The auxiliary reflector 182 may include a white material provided on the lower surface of the first fixing part 131. The white material may be a dye applied to the lower surface of the first fixing part 131, or a white strip attached on the lower surface of the first fixing part 131. Also, the auxiliary reflector 182 may include a reflecting mirror. Also, the auxiliary reflector 182 may be one of various means that can be used to reflect light.

The upper housing 101 may be disposed around the edges of the display panel 110 to secure the display panel 110. The second fixing part 103 (see FIG. 2) of the upper housing 101 may form a bezel of the display apparatus 100a. The upper housing 101 may be fabricated as a separate unit from the middle housing 130 and then coupled with or attached on the middle housing 130 by separate coupling means. Alternatively, the upper housing 101 may be integrated with the middle housing 130.

Figure 4:
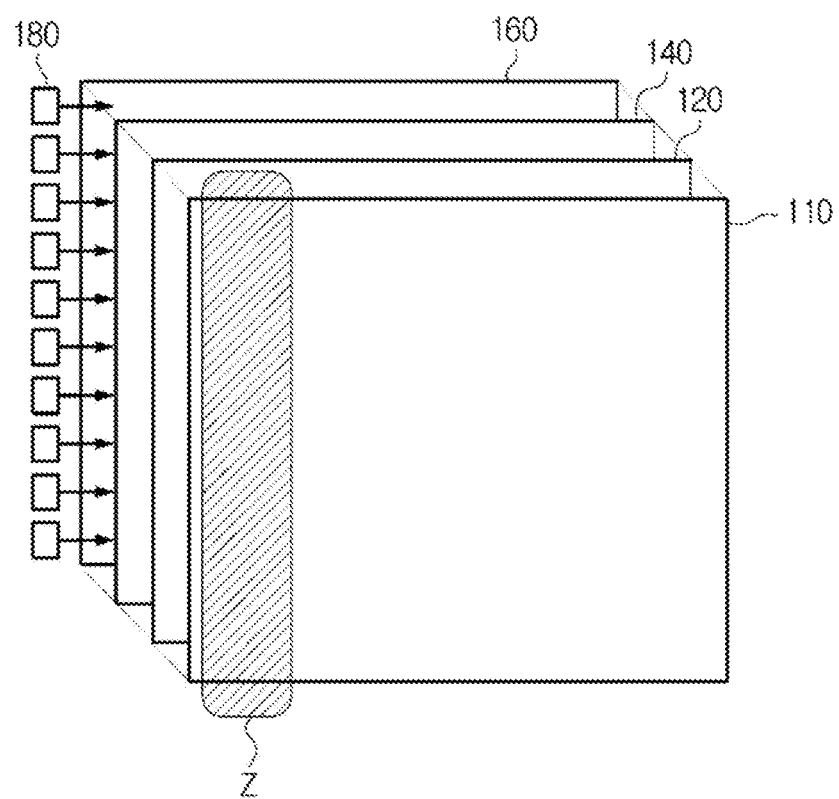
FIG. 4 illustrates a display apparatus according to an exemplary embodiment.
Figure 5:
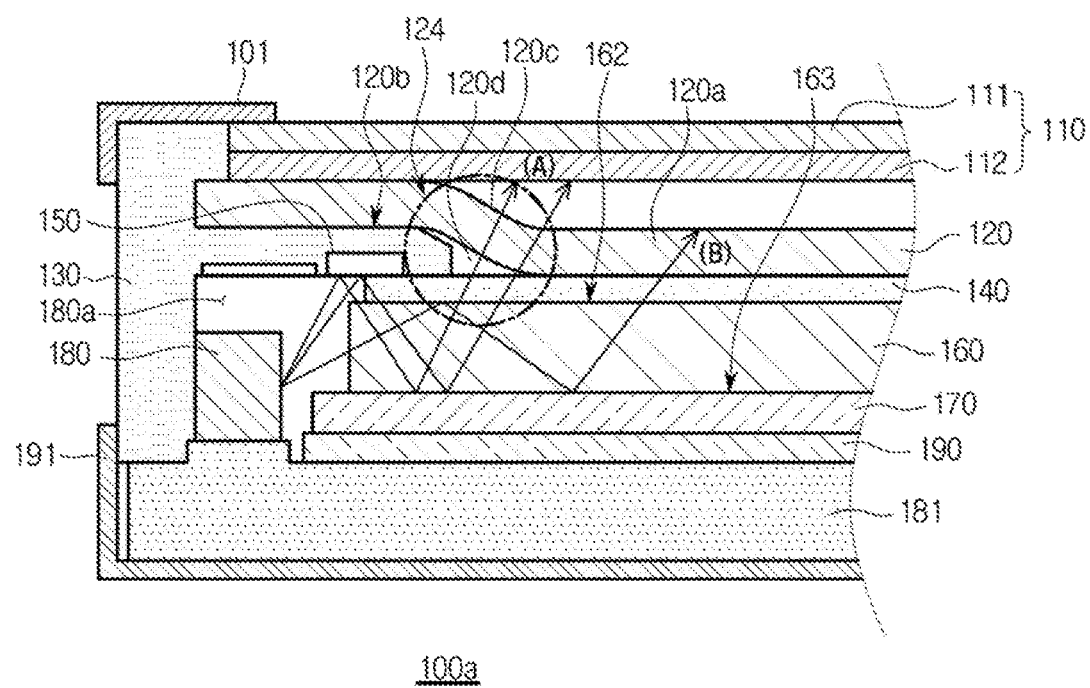
FIG. 5 shows an example of directions in which emitted light is incident in the display apparatus according to the first exemplary embodiment.

FIG. 4 illustrates the display apparatus according to an embodiment, and FIG. 5 shows an example of directions in which emitted light may travel in the display apparatus according to the first exemplary embodiment.

Referring to FIG. 4, light emitted from the light source 180 may pass through the light guide plate 160, the quantum dot sheet 140, the optical sheet 120, and the display panel 110, and then be emitted as a predetermined screen to the outside.

Referring to FIG. 5, the optical sheet 120 may be disposed on the first fixing part 131 and the quantum dot sheet 140. In this case, since the first fixing part 131 is disposed on the quantum dot sheet 140 to secure the quantum dot sheet 140, the quantum dot sheet 140 may be disposed lower than the first fixing part 131, that is, closer to the PCB 181 than the first fixing part 131. Accordingly, an area 120a of the optical sheet 120 contacting the quantum dot sheet 140 may be positioned lower than another area 120b of the optical sheet 120 contacting the first fixing part 131, that is, the area 120a is closer to the PCB 181 than the other area 120b of the optical sheet 120. Due to the difference in position, the optical sheet 120 may have a bent part 120c as shown in a circle. In this case, the optical sheet 120 may be bent in an "S"-like shape as shown in FIG. 5. Accordingly, an air gap 120d may be formed between the bent part 120c of the optical sheet 120, the first fixing part 150, and the quantum dot sheet 140. The air gap 120d may be much larger than a gap between the optical sheet 120 and the quantum dot sheet 140.

If there is no color transforming element 150, a part of light emitted from the light source 180 may be reflected from the lower surface of the first fixing part 150, be incident to the quantum dot sheet 140 or the light guide plate 160, be reflected from the reflector 170, then pass through the air gap 120d, and be transferred to the optical sheet 120 and the display panel 110 (path A). In this case, the light passed through the air gap 120d may be again reflected in the air gap 120d as in the gap between the optical sheet 120 and the quantum dot sheet 140. However, since the air gap 120d is larger than the gap between the optical sheet 120 and the quantum dot sheet 140, the light may react with the quantum dot sheet 140 at a relatively weak degree, and as a result, the light passed through the air gap 120d and then output to the outside may be different from intended light. For example, if the light source 180 emits blue light, light passing through the air gap 120d and then output to the outside may be bluer than an intended color. Since the air gap 120d is formed mainly in the edge of the light guide plate 160 or the quantum dot sheet 140 adjacent to the light source 180, as shown in FIG. 4, in an edge area z adjacent to the light source 180, a screen that is bluer than an intended color may be displayed.

The color transforming element 150 may change a color of light that can pass through the air gap 120d in order to prevent light of a different color from an intended color from exiting. If the light source 180 emits blue light, the color transforming element 150 may emit light of a color corresponding to the blue light. In this case, the light emitted from the color transforming element 150 may be yellow-reinforced light.

Figure 6:
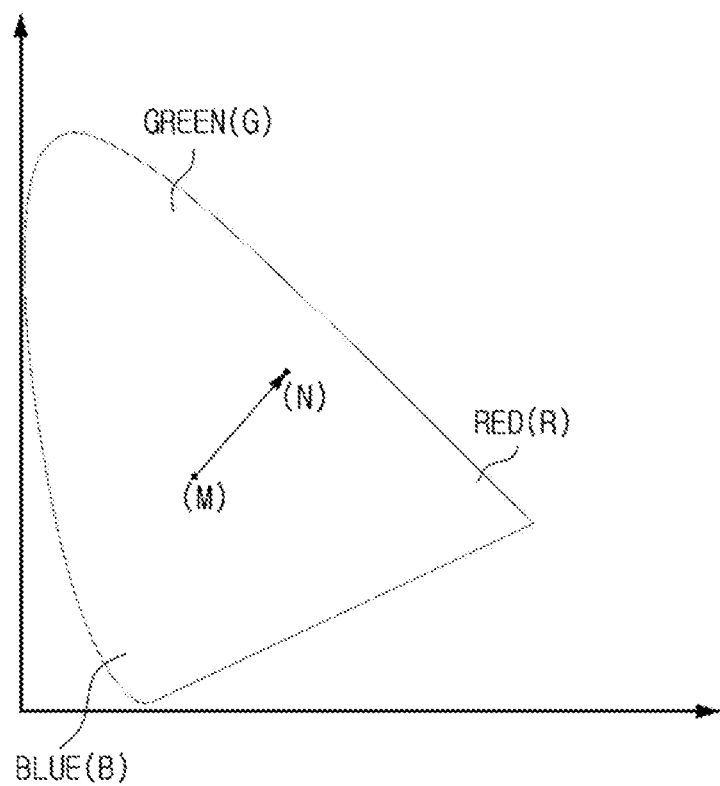
FIG. 6 is chart for describing a change in color of light by a color transforming element according to an exemplary embodiment.

FIG. 6 is a view for describing a change in color of light by the color transforming element 150. More specifically, FIG. 6 shows the CIE 1931 color space (CIE 1931) as defined by the International Commission on Illumination (CIE). In the CIE 1931 as shown in FIG. 6, a green (G) color or greenish colors may be mapped as the y-axis coordinates increase, and a red (R) color or reddish colors may be mapped as the x-axis coordinates increase. Also, as x- and y-axis coordinates approach zero, a blue (B) color or bluish colors may be mapped. Meanwhile, in the area between the green (G) color and the red (R) color, a yellow (Y) color or yellowish colors may be mapped.

When the light source 180 emits blue light, the blue light emitted from the light source 180 may be light of a color corresponding to a first point M of FIG. 6. The color transforming element 150 may change the blue light corresponding to the first point M to a color corresponding to a second point N of FIG. 6, and emit light of the changed color. In other words, the color transforming element 150 may emit yellow-reinforced light based on the color of the light emitted from the light source 180. Then, although reaction of the light exiting the color transforming element 150 with the quantum dot sheet 140 is relatively weak, an intended color or a color similar to the intended color, instead of blue, may be displayed in the edge area z adjacent to the light source 180 since yellow was reinforced. Accordingly, the color of the edge area z adjacent to the light source 180 in a display screen can be represented as an intended color.

In the first exemplary embodiment, the upper housing 101, the display panel 110, the optical sheet 120, the quantum dot sheet 140, the light guide plate 160, the reflector 170, the spacer 190, the PCB 181, the light source 180, the middle housing 130, the first fixing part 131, and the color transforming element 150 may be the similar components as those described above with reference to FIG. 2. However, some of the aforementioned components may be modified within the scope one or more exemplary embodiments that can be considered by a person of ordinary skill in the art.

Figure 7:
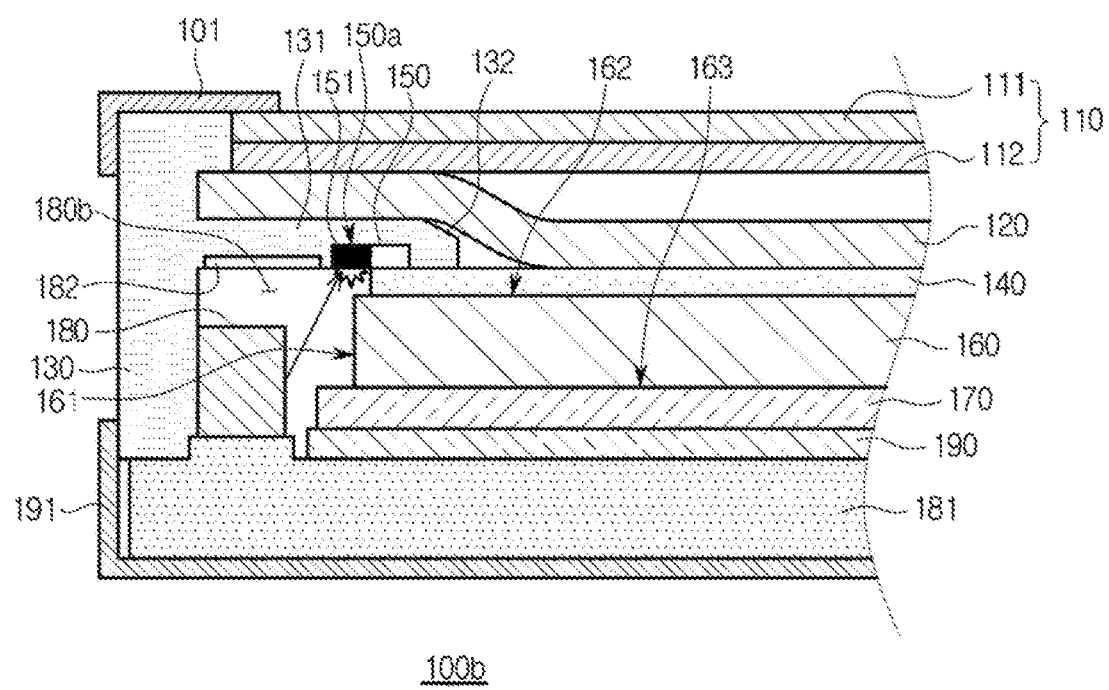
FIG. 7 is a cross-sectional view of a display apparatus according to a second exemplary embodiment.

Hereinafter, display apparatuses according to second and third embodiments will be described. FIG. 7 is a cross-sectional view of a display apparatus according to a second exemplary embodiment, and FIG. 8 is a cross-sectional view of a display apparatus according to a third exemplary embodiment.

Figure 8:
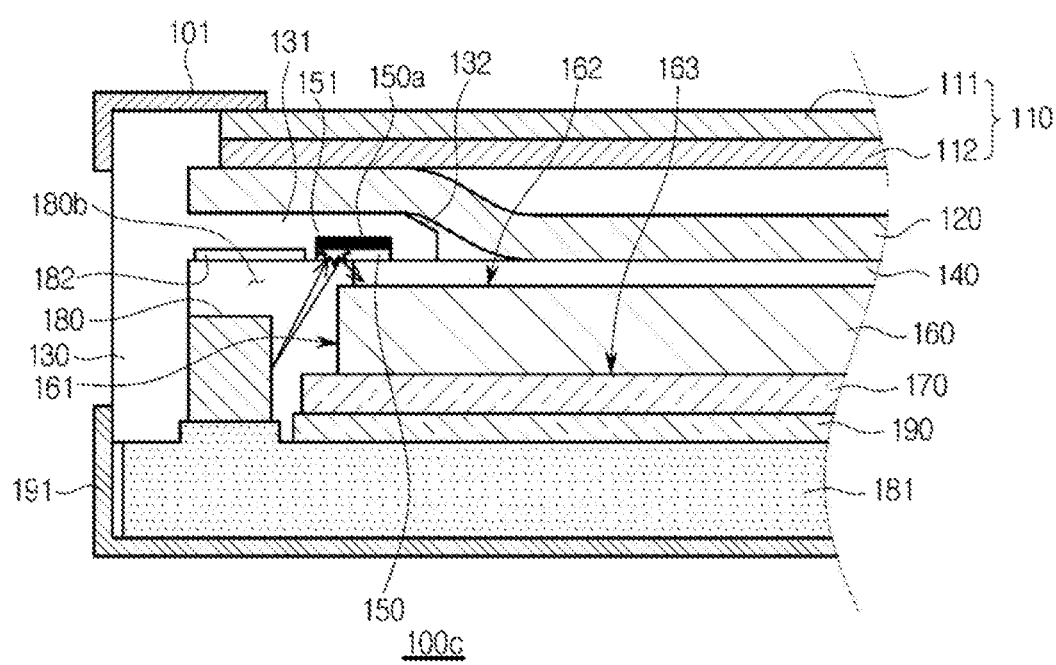
FIG. 8 is a cross-sectional view of a display apparatus according to a third exemplary embodiment.

According to the second and third exemplary embodiments as shown in FIGS. 7 and 8, each of display apparatuses 100b and 100c may include an upper housing 101, a display panel 110, an optical sheet 120, a quantum dot sheet 140, a light guide plate 160, a reflector 170, a spacer 190, a PCB 181, a light source 180, a middle housing 130, a first fixing part 131, and a color transforming element 150, and may further include a first light absorbing element 151 disposed alongside the color transforming element 150. However, some of the aforementioned components may be omitted within the scope of one or more exemplary embodiments.

The display panel 110 may be an LCD panel including a thin film transistor board 111 and a color display board 112. However, the display panel 110 may be one of other various kinds of display panels.

The optical sheet 120 may transfer light exiting the optical sheet 120 to the display panel 110. A gap or an air gap may be formed between the optical sheet 120 and the quantum dot sheet 140.

The quantum dot sheet 140 may receive light exiting the light guide plate 160, and then selectively change a color of the received light. In the quantum dot sheet 140, a plurality of quantum dots may be distributed to change the color of light.

Light emitted from the light source 180 or light exiting the color transforming element 150 may be incident to an incident surface 161 of the light guide plate 160 facing the light source 180. Light emitted from the light source 180 or light exiting the color transforming element 150 may be incident through an exit surface 162 of the light guide plate 160. The incident light may be reflected one or more times within the light guide plate 160. The incident light reflected within of the light guide plate 160 may exit toward the quantum dot sheet 140 through the exit surface 162. The light guide plate 160 may be made of a synthetic resin, such as PMMA or Poly Methylstrene.

The reflector 170 may contact a reflective surface 163 of the light guide plate 160. The reflector 170 may reflect light from the reflective surface 163 of the light guide plate 160 back to the inside of the light guide plate 160. The reflector 170 may extend adjacent to the light source 180, thereby reflecting a part of light emitted from the light source 180 toward the incident surface 161 of the light guide plate 160. The reflector 170 may be made of PET or PC.

The light source 180 may emit light of a predetermined color such as blue. A part of light emitted from the light source 180 may arrive at the incident surface 161 of the light guide plate 160 directly, may be reflected by the reflector 170 or the auxiliary reflector 182 and then arrive at the incident surface 161 of the light guide plate 160, or may arrive at the color transforming element 150. Also, a part of light emitted from the light source 180 may be absorbed by the first light absorbing element 151. The light source 180 may be an LED.

The light source 180 may be mounted on the PCB 181. On the PCB 181, a semiconductor chip and a circuit for controlling light emission by the light source 180 may be mounted. The PCB 181 may control various operations of the display apparatus 100b or 100c.

The spacer 190 may be interposed between the PCB 181 and the reflector 170 to prevent elements mounted on the PCB 181 and the reflector 170 from being damaged.

The first fixing part 131 may protrude toward the optical sheet 120 and the quantum dot sheet 140 in the middle housing 130, and secure the quantum dot sheet 140. The upper surface of the first fixing part 131 may face the lower surface of the optical sheet 120, and the lower surface of the first fixing part 131 may face the upper surface of the quantum dot sheet 140.

The color transforming element 150 may emit exit light of a color that is different from that of incident light emitted by the light source 180. According to an exemplary embodiment, the color transforming element 150 may include a fluorescent material. One surface of the color transforming element 150 may contact the quantum dot sheet 140, and the other surface of the color transforming element 150 may contact the lower surface of the first fixing part 131 or the inner surface of the alignment groove 150a formed in the lower surface of the first fixing part 131.

The upper housing 101 may be attached around the edges of the display panel 110 to secure the display panel 110. The second fixing part 103 (see FIG. 2) of the upper housing 101 may form a bezel of the display apparatus 100b or 100c. The upper housing 101 may be attached on the middle housing 130. Alternatively, the upper housing 101 may be formed by extending a portion of the middle housing 130.

The first light absorbing element 151 may be made of a material that can absorb light, more specifically, a black material. The black material may be a black dye applied to a surface of the first fixing part 131, or a black strip attached to a surface of the first fixing part 131.

According to an exemplary embodiment, as shown in FIG. 7, the first light absorbing element 151 may be disposed alongside the color transforming element 150. The first light absorbing element 151 may be disposed closer to the light source 180 relative to the color transforming element 150, and the color transforming element 150 may be disposed closer to the quantum dot sheet 140 or the light guide plate 160 relative to the first light absorbing element 151.

The first light absorbing element 151 may absorb a part of light emitted from the light source 180 so that only light with an incident angle within a predetermined angle range can be incident to the color transforming element 150. Accordingly, a color of light with an incident angle that is within a predetermined angle range may be changed and emitted by the color transforming element 150, and then incident to the quantum dot sheet 140 or the light guide plate 160. Light with an incident angle that is out of the predetermined angle range may be absorbed and not transferred to the quantum dot sheet 140 or the light guide plate 160. In this case, the first light absorbing element 151 may be exposed to a space 180b in which the light source 180 is installed, may contact the quantum dot sheet 140, or may contact the light guide plate 160. A part of the first light absorbing element 151 may be exposed to the space 180b in which the light source 180 is installed, and the other part of the first light absorbing element 151 may contact the quantum dot sheet 140. Also, a part of the first light absorbing element 151 may be exposed to the space 180b in which the light source 180 is installed, and the other part of the first light absorbing element 151 may contact the light guide plate 160.

According to another exemplary embodiment, as shown in FIG. 8, the first light absorbing element 151 may be disposed in contact with the rear surface of the color transforming element 150. In other words, the first light absorbing element 151 and the color transforming element 150 may be stacked. In this case, one surface of the first light absorbing element 151 may contact the inner surface of the alignment groove 150a, and the other surface of the first light absorbing element 151 may contact one surface of the color transforming element 150. One surface of the color transforming element 150 may contact the other surface of the first light absorbing element 151, and the other surface of the color transforming element 150 may be exposed to the space 180b or contact the quantum dot sheet 140 or the light guide plate 160. In this case, the first light absorbing element 151 may absorb the entirety or a portion of light that passes through the color transforming element 150. Accordingly, the first light absorbing element 151 may emit light corresponding to a part of light incident to the color transforming element 150 and the color of light emitted from the color transforming element 50 is different from that of the incident light, to the space 180b. Accordingly, an amount of light that exits the color transforming element 150 can be adjusted.

Also, in the second and third exemplary embodiments, the upper housing 101, the display panel 110, the optical sheet 120, the quantum dot sheet 140, the light guide plate 160, the reflector 170, the spacer 190, the PCB 181, the light source 180, the middle housing 130, the first fixing part 131, and the color transforming element 150 may be similar to components described above with reference to FIGS. 2 and 3. However, one or more of the upper housing 101, the display panel 110, the optical sheet 120, the quantum dot sheet 140, the light guide plate 160, the reflector 170, the spacer 190, the PCB 181, the light source 180, the middle housing 130, the first fixing part 131, and the color transforming element 150 may be modified.

Hereinafter, display apparatuses according to fourth and fifth exemplary embodiments will be described with reference to FIGS. 9 and 10.

Figure 9:
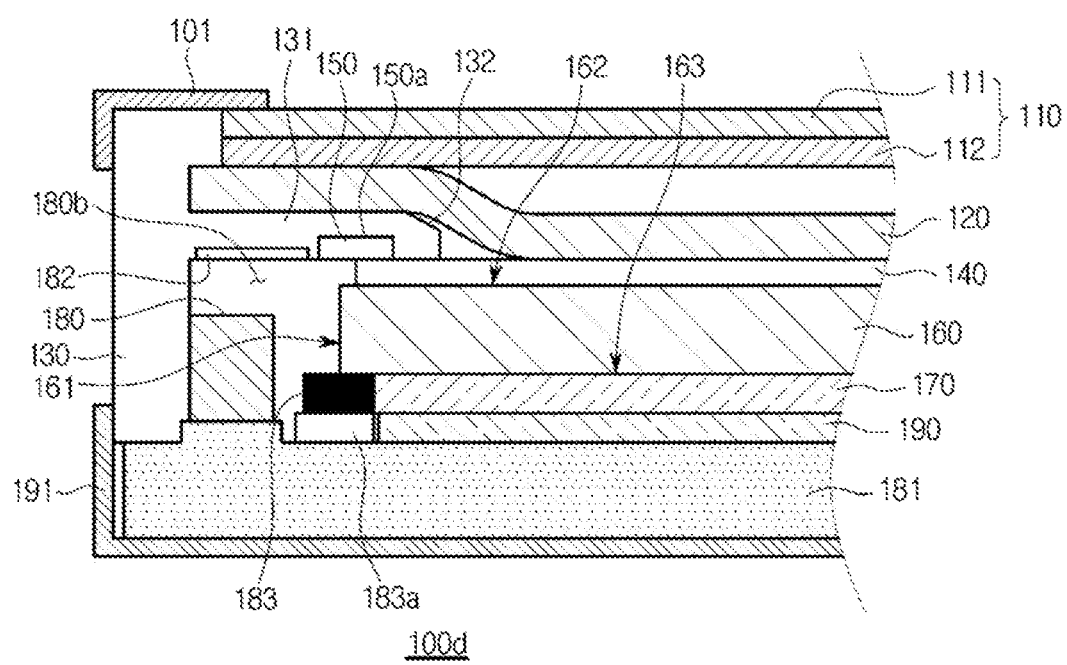
FIG. 9 is a cross-sectional view of a display apparatus according to a fourth exemplary embodiment.

FIG. 9 is a cross-sectional view of a display apparatus according to a fourth exemplary embodiment.

Referring to FIG. 9, a display apparatus 100d according to a fourth embodiment may include an upper housing 101, a display panel 110, an optical sheet 120, a quantum dot sheet 140, a light guide plate 160, a reflector 170, a light source 180, a PCB 181, an auxiliary reflector 182, a spacer 190, a middle housing 130, a first fixing part 131, and a color transforming element 150, and may further include a second light absorbing element 183. However, one or more of the aforementioned components may be omitted or modified.

The display panel 110 may be one of various kinds of display panels, such as an LCD panel.

The optical sheet 120 may transfer light exiting the quantum dot sheet 140 to the display panel 110. A gap or an air gap may be formed between the optical sheet 120 and the quantum dot sheet 140.

The quantum dot sheet 140 may receive light exiting the light guide plate 160, and change the wavelength of the received light to change a color of the light. In the quantum dot sheet 140, a plurality of quantum dots may be distributed to selectively change a color of the received light.

Light emitted from the light source 180 or light exiting the color transforming element 150 may be incident to the light guide plate 160. Light emitted from the light source 180 or light exiting the color transforming element 150 may be incident through an incident surface 161 of the light guide plate 160, or through an exit surface 162 of the light guide plate 160. Inside of the light guide plate 160, light may be reflected one or more times. The light reflected one or more times inside the light guide plate 160 may be emitted toward the quantum dot sheet 140 through the exit surface 162. Accordingly, the light guide plate 160 may supply the incident light to the quantum dot sheet 140 contacting the exit surface 162 of the light guide plate 160. The light guide plate 160 may be made of a synthetic resin, such as PMMA or Poly Methylstrene. The light guide plate 160 may supply the light uniformly or substantially uniformly to the quantum dot sheet 140.

The reflector 170 may contact a reflective surface 163 of the light guide plate 160, and reflect light arrived at the reflective surface 163 to the inside of the light guide plate 160. The reflector 170 may be made of PET or PC. As shown in FIG. 9, the second light absorbing element 183 may extend alongside the reflector 170.

The light source 180 may emit light. The light emitted from the light source 180 may have a predetermined color. The predetermined color may be blue. A part of light emitted from the light source 180 may arrive directly at the incident surface 161 of the light guide plate 160, may be reflected from the reflector 170 or the auxiliary reflector 182 and then arrive at the incident surface 161 of the light guide plate 160, or may arrive at the color transforming element 150. The light emitted from the light source 180 may be absorbed by the second light absorbing element 183. The light source 180 may be an LED.

The light source 180 may be mounted on the PCB 181. The PCB 181 may apply an electrical signal to the light source 180. On the PCB 181, a semiconductor chip and a circuit for controlling light emission of the light source 180 may be mounted. Also, the PCB 181 may control various operations of the display apparatus 100d or 100e.

The spacer 190 may be interposed between the PCB 181 and the reflector 170 to prevent elements mounted on the PCB 181 and the reflector 170 from being damaged.

The first fixing part 131 may protrude from the middle housing 130 toward the optical sheet 120 and the quantum dot sheet 140, and secure the quantum dot sheet 140. The upper surface of the first fixing part 131 may face the lower surface of the optical sheet 120, and the lower surface of the first fixing part 131 may face the upper surface of the quantum dot sheet 140.

The color transforming element 150 may emit exit light of a color that is different from that of incident light, as described above. According to an exemplary embodiment, the color transforming element 150 may include a fluorescent material. One surface of the color transforming element 150 may contact the quantum dot sheet 140, and the other surface of the color transforming element 150 may contact the lower surface of the first fixing part 131 or the inner surface of an alignment groove 150a formed in the lower portion of the first fixing part 131.

The upper housing 101 may be disposed around the edges of the display panel 110 to secure the display panel 110. The upper housing 101 may include a second fixing part 103 (see FIG. 2) with a protruded structure.

The second light absorbing element 183 may absorb light exiting the color transforming element 150 or light emitted by the light source 180. Since the second light absorbing element 183 absorbs a portion of light exiting the color transforming element 150 or light emitted from the light source 180, only light exiting the color transforming element 150 and having an exit angle that is within a predetermined angle range may be transferred to the quantum dot sheet 140 or the light guide plate 160. Accordingly, the second light absorbing element 183 can adjust an amount of light that is incident to the quantum dot sheet 140 or the light guide plate 160.

The second light absorbing element 183 may be mounted on one surface of the PCB 181 or the spacer 190.

According to an exemplary embodiment, the second light absorbing element 183 may extend alongside the reflector 170, as shown in FIG. 9. Also, the second light absorbing element 183 may be disposed in contact with the edge of the reflector 170. The second light absorbing element 183 may be mounted on the PCB 181 in such a way to extend alongside the reflector 170. In this case, a protrusion 183a having a predetermined height may be mounted on the PCB 181 so that the second light absorbing element 183 can be disposed alongside the reflector 170.

The second light absorbing element 183 may be made of a material such as a black material that can absorb light. The black material may be a black dye applied to a surface of the PCB 181 or the spacer 190, or a black strip attached to a surface of the PCB 181 or the spacer 190.

Figure 10:
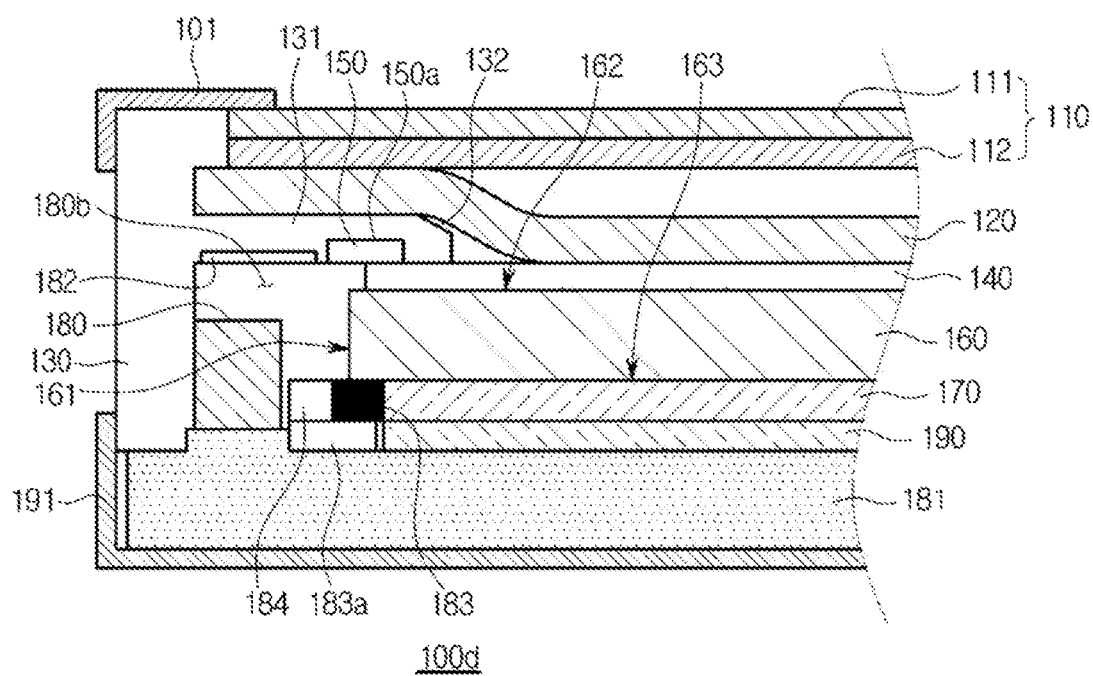
FIG. 10 is a cross-sectional view of a display apparatus according to a fifth exemplary embodiment.

FIG. 10 is a cross-sectional view of a display apparatus according to a fifth exemplary embodiment.

Referring to FIG. 10, a display apparatus 100e according to a fifth exemplary embodiment may include an upper housing 101, a display panel 110, an optical sheet 120, a quantum dot sheet 140, a light guide plate 160, a reflector 170, a light source 180, a PCB 181, an auxiliary reflector 182, a spacer 190, a middle housing 130, a first fixing part 131, and a color transforming element 150, and may further include a second light absorbing element 183 disposed alongside the reflector 170, and an auxiliary reflector 184 disposed alongside the second light absorbing element 183.

However, one or more of the aforementioned components may be omitted according to one or more exemplary embodiments.

The second light absorbing element 183 may absorb light exiting the color transforming element 150 or light emitted from the light source 180. The second light absorbing element 183 may absorb a portion of light exiting the color transforming element 150 or light emitted from the light source 180 so that only specific light can be incident to the quantum dot sheet 140 or the inside of the light guide plate 160.

The second light absorbing element 183 may be mounted on one surface of the PCB 181 or the spacer 190.

The second light absorbing element 183 may be disposed alongside the reflector 170, as shown in FIG. 10, or may contact the edge of the reflector 170 as necessary. The second light absorbing element 183 may be mounted on the PCB 181 in such a way to extend alongside the reflector 170. In this case, a protrusion 183a having a predetermined height may be mounted on the PCB 181 so that the second light absorbing element 183 can be disposed alongside the reflector 170.

The second light absorbing element 183 may be made of a material such as a black material that can absorb light. The black material may be a black dye applied to a surface of the PCB 181 or the spacer 190, or a black strip attached to a surface of the PCB 181 or the spacer 190.

The auxiliary reflector 184 may reflect light emitted from the light source 180 toward the quantum dot sheet 140, the light guide plate 160, or the color transforming element 150. Also, the auxiliary reflector 184 may reflect light exiting the color transforming element 150 so that the reflected light is transferred to the quantum dot sheet 140 or the light guide plate 160. Since the auxiliary reflector 184 can reflect incident light toward the quantum dot sheet 140, the light guide plate 160, or the color transforming element 150, the auxiliary reflector 184 can prevent leakage of light emitted from the light source 180 or light exiting the color transforming element 150, thereby increasing an optical efficiency of the display apparatus 100.

The auxiliary reflector 184 may be mounted on one surface of the PCB 181 or the spacer 190 on which the second light absorbing element 183 is installed. As shown in FIG. 10, the auxiliary reflector 184 may be mounted on one surface of the PCB 181 alongside the second light absorbing element 183. According to an exemplary embodiment, the auxiliary reflector 184 may be applied or attached on the protrusion 183a mounted on the PCB 181, disposed alongside the reflector 170.

The auxiliary reflector 182 may include a white material that can be provided on a surface of the PCB 181 or the spacer 190. The white material may be a white dye applied to surface of the PCB 181 or the spacer 190, or a white strip attached to a surface of the PCB 181 or the spacer 190. Also, the auxiliary reflector 182 may include a reflecting mirror. Also, the auxiliary reflector 182 may be one of various structures that can be used to reflect light.

In the fourth and fifth exemplary embodiments, the upper housing 101, the display panel 110, the optical sheet 120, the quantum dot sheet 140, the light guide plate 160, the reflector 170, the spacer 190, the PCB 181, the light source 180, the middle housing 130, the first fixing part 131, and the color transforming element 150 may be similar to the components described above with reference to FIGS. 2 and 3. However, one or more of the aforementioned components may be modified within the scope one or more exemplary embodiments that can be considered by a person of ordinary skill in the art, and applied to the fourth or fifth exemplary embodiment. For example, the display apparatus 100d or 100e according to the fourth or fifth exemplary embodiment may further include a first light absorbing element 151 located adjacent to the color transforming element 150, wherein the first light absorbing element 151 may be disposed alongside the color transforming element 150 or may be stacked with the color transforming element 150 in such a way to contact the rear surface of the color transforming element 150.

Figure 11:
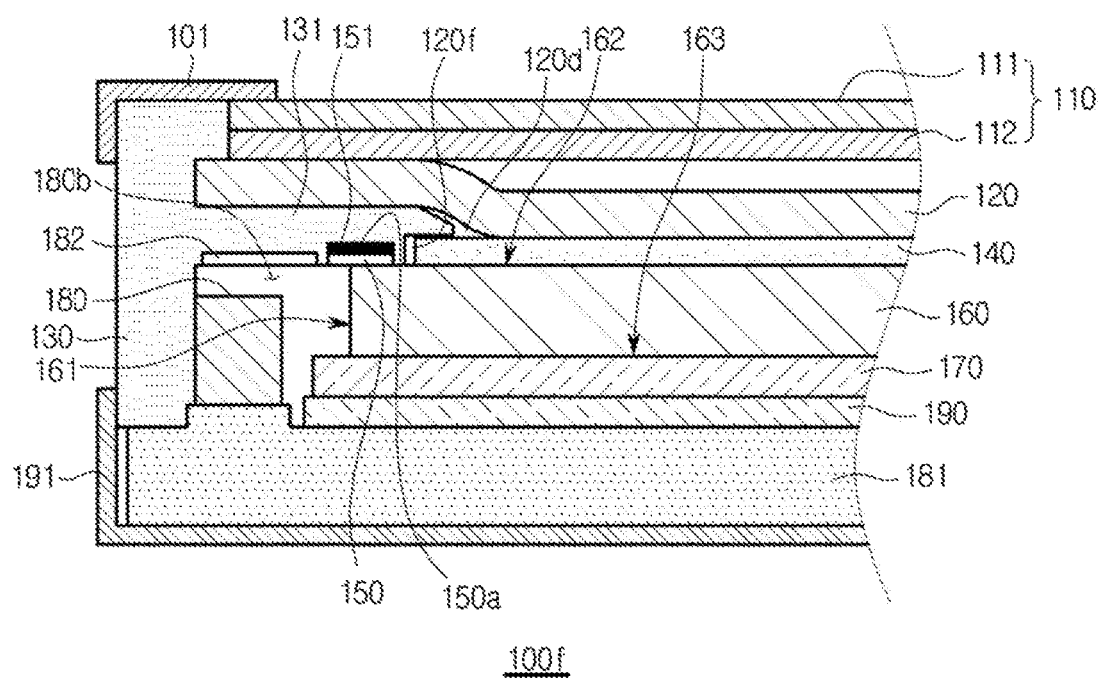
FIG. 11 is a cross-sectional view of a display apparatus according to a sixth exemplary embodiment.

Hereinafter, a display apparatus according to a sixth exemplary embodiment will be described with reference to FIG. 11. FIG. 11 is a cross-sectional view of a display apparatus according to a sixth exemplary embodiment;

Referring to FIG. 11, a display apparatus 100f according to a sixth exemplary embodiment may include an upper housing 101, a display panel 110, an optical sheet 120, a quantum dot sheet 140, a light guide plate 160, a reflector 170, a spacer 190, a PCB 181, a light source 180, a middle housing 130, a first fixing part 133 with a second structure, and a color transforming element 150. However, one or more of the aforementioned components may be omitted according to one or more exemplary embodiments.

The display panel 110 may be one of various kinds of display panels, such as an LCD panel.

The optical sheet 120 may transfer light emitted from the quantum dot sheet 140 to the display panel 110, and a gap or an air gap may be formed between the optical sheet 120 and the quantum dot sheet 140.

The quantum dot sheet 140 may receive light exiting the light guide plate 160, change the color of the received light, and then emit the light with the changed color. In the quantum dot sheet 140, a plurality of quantum dots may be distributed to change a color of light.

Light emitted from the light source 180 or light exiting the color transforming element 150 may be incident to the light guide plate 160. Light emitted from the light source 180 or light exiting the color transforming element 150 may enter the light guide plate 160 through an incident surface 161 of the light guide plate 160, or through an exit surface 162 of the light guide plate 160. The incident light may be reflected one or more times within the light guide plate 160, and then emitted toward the quantum dot sheet 140 through an exit surface 162. The light guide plate 160 may be made of a synthetic resin, such as PMMA or Poly Methylstrene.

The reflector 170 may be disposed below the reflective surface 163 of the light guide plate 160, and reflect light arrived at the reflective surface 163 back inside of the light guide plate 160. The reflector 170 may extend adjacent to the light source 180 to reflect a part of light emitted from the light source 180 toward the incident surface 161 of the light guide plate 160. According to an exemplary embodiment, a second light absorbing element 183 may be disposed alongside the edge of the reflector 170, as shown in FIG. 9. According to another exemplary embodiment, the second light absorbing element 183 may be disposed alongside the edge of the reflector 170, and an auxiliary reflector 182 may be disposed alongside the second light absorbing element 183, as shown in FIG. 10. The reflector 170 may be made of PET or PC.

The light source 180 may emit light of a predetermined color. The predetermined color may be blue. A part of light emitted from the light source 180 may arrive directly at the incident surface 161 of the light guide plate 160, may be reflected by the reflector 170 or the auxiliary reflector 182 and then arrive at the incident surface 161 of the light guide plate 160, or may arrive at the color transforming element

150. A part of light emitted from the light source 180 may be absorbed by the first light absorbing element 151 as shown in FIGS. 7 and 8, or by the second light absorbing element 183 as shown in FIGS. 9 and 10. The light source 180 may be an LED.

The light source 180 may be mounted on the PCB 181. On the PCB 181, a semiconductor chip and a circuit for controlling light emission of the light source 180 may be mounted. The PCB 181 may control various operations of the display apparatus 100f.

The spacer 190 may be interposed between the PCB 181 and the reflector 170 so that elements mounted on the PCB 181 and the reflector 170 are prevented from damaging each other.

The upper housing 101 may be disposed around the edge of the display panel 110 to secure the display panel 110. The second fixing part 103 (see FIG. 2) of the upper housing 101 may form a bezel.

The first fixing part 133 with the second structure may be provided in a shape that is different from that of the first fixing part 131 described in the first to fifth exemplary embodiments. The first fixing part 133 with the second structure may protrude from the middle housing 130 toward the optical sheet 120 and the quantum dot sheet 140.

On the upper surface of the first fixing part 133 with the second structure, the optical sheet 120 may be disposed, and below the lower surface of the first fixing part 133 with the second structure, the quantum dot sheet 140 may be disposed. The upper surface of the first fixing part 133 with the second structure means the surface of the first fixing part 133 with the second structure facing toward the display panel 110, and the lower surface of the first fixing part 133 with the second structure means the surface of the first fixing part 133 with the second structure facing toward the PCB 181. The upper surface of the first fixing part 133 with the second structure may face the lower surface of the optical sheet 120, and the lower surface of the first fixing part 133 with the second structure may face the upper surface of the quantum dot sheet 140.

Accordingly, the first fixing part 133 with the second structure may be inserted between the optical sheet 120 and the quantum dot sheet 140, as described above. The lower surface of the first fixing part 133 with the second structure may contact the upper surface of the quantum dot sheet 140, or be spaced by a predetermined distance apart from the quantum dot sheet 140.

The optical sheet 120 may be disposed on the upper surface of the first fixing part 133 with the second structure and the upper surface of the quantum dot sheet 140. Along the edge of the first fixing part 133 with the second structure, a cutting surface 134 cut at a predetermined angle may be further formed in order to prevent the optical sheet 120 from being damaged.

An air gap 120d may be formed between the optical sheet 120, the first fixing part 133 with the second structure, and the quantum dot sheet 140. The air gap 120d may be larger than a gap between the optical sheet 120 and the quantum dot sheet 140. Due to the air gap 120d, in an edge area z adjacent to the light source 180, a screen that is bluer than an intended color may be displayed.

Also, an air gap 120f may be formed between the first fixing part 133 with the second structure and the quantum dot sheet 140. The color transforming element 150 may be exposed to the air gap 120f formed between the first fixing part 133 with the second structure and the quantum dot sheet 140, unlike the embodiment shown in FIG. 11. In this case, light exiting the color transforming element 150 may be directly transferred to the quantum dot sheet 140.

Below the first fixing part 133 with the second structure, the color transforming element 150 may be disposed. In this case, the color transforming element 150 may be disposed below the first fixing part 133 with the second structure and not in contact with the quantum dot sheet 140. In this case, the color transforming element 150 may be disposed such that the color transforming element 150 is positioned alongside the quantum dot sheet 140. The color transforming element 150 and the quantum dot sheet 140 may be spaced a predetermined distance apart from each other. The predetermined distance between the color transforming element 150 and the quantum dot sheet 140 may be arbitrarily decided according to a designer's selection. Accordingly, an area (a first area) of the lower surface of the edge of the first fixing part 133 with the second structure may contact or be disposed adjacent to the upper surface of one edge of the quantum dot sheet 140, and an area (a second area) of the lower surface of the first fixing part 133 with the second structure closer to the middle housing 130 in the edge of the first fixing part 133 may contact the color transforming element 150. The first and second areas may not overlap each other.

In the lower surface of the first fixing part 133 with the second structure, an alignment groove 150a may be formed, as necessary, so that the color transforming element 150 can be inserted into the fixing part 133 with the second structure through the alignment groove 150a. The alignment groove 150a may not continue to the first area that contacts the quantum dot sheet 140 so that the color transforming element 150 does not contact the quantum dot sheet 140. However, the alignment groove 150a may be omitted.

One surface of the color transforming element 150 may contact the light guide plate 160. The other surface of the color transforming element 150 may contact the lower surface of the first fixing part 133 with the second structure or the inner surface of an alignment groove 150a formed in the lower portion of the first fixing part 133 with the second structure. According to an exemplary embodiment, a portion of the color transforming element 150 may contact the light guide plate 160. According to another exemplary embodiment, a part of the structure of the color transforming element 150 may contact the light guide plate 160, and the other part of the color transforming element 150 may be exposed to the space 180b in which the light source 180 is installed.

According to an exemplary embodiment, a first light absorbing element 151 may be disposed alongside the color transforming element 150, as shown in FIG. 7. In this case, the first light absorbing element 151 may absorb a portion of light emitted from the light source 180 so that only light with an incident angle within a predetermined angle range can be incident to the color transforming element 150. According to another exemplary embodiment, the first light absorbing element 151 may be formed to contact the rear surface of the color transforming element 150, as shown in FIGS. 8 and 11. In other words, one surface of the first light absorbing element 151 may be in contact with the lower surface of the first fixing part 133 with the second structure, and the color transforming element 150 may be in contact with the other surface of the first light absorbing element 151 so that the first light absorbing element 151 and the color transforming element 150 are stacked with each other. In this case, the first light absorbing element 151 may absorb the entirety or a portion of light that passes through the color transforming element 150 so that light with a different color corresponding to a part of light incident to the color transforming element 150 is emitted to the space 180b. However, according to another exemplary embodiment, the first light absorbing element 151 may be omitted.

The color transforming element 150 may emit exit light of a color that is different from that of the incident light of the light source 180, as described above. According to an exemplary embodiment, the color transforming element 150 may include a fluorescent material.

An auxiliary reflector 182 may be further disposed alongside the color transforming element 150. The auxiliary reflector 182 may include a white material that can be provided on the lower surface of the first fixing part 133 with the second structure. The white material may be a white dye applied to the lower surface of the first fixing part 133 with the second structure, or a white strip attached to on the lower surface of the first fixing part 133 with the second structure.

Figure 12:
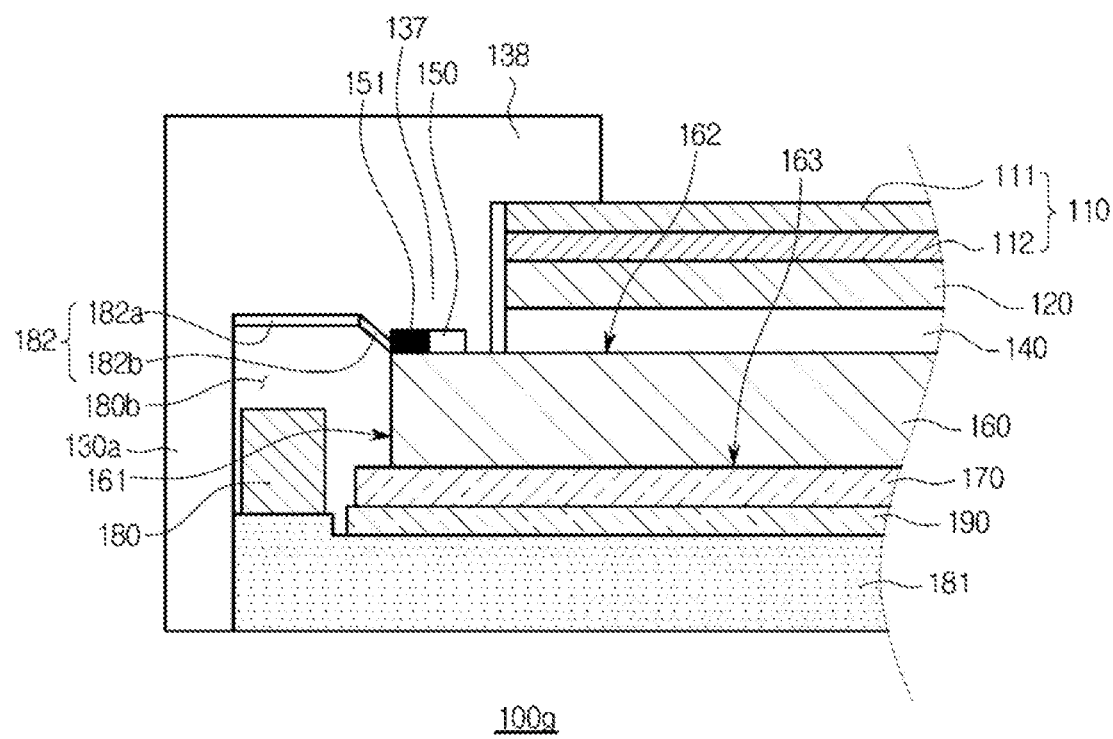
FIG. 12 is a cross-sectional view of a display apparatus according to a seventh exemplary embodiment.

Hereinafter, a display apparatus according to a seventh exemplary embodiment will be described. FIG. 12 is a cross-sectional view of a display apparatus according to a seventh exemplary embodiment.

Referring to FIG. 12, a display apparatus 100g may include a display panel 110, an optical sheet 120, a housing 130a, a quantum dot sheet 140, a light guide plate 160, a reflector 170, a light source 180, a PCB 181, a spacer 190, and a color transforming element 150. However, one or more of the aforementioned components may be omitted according to one or more exemplary embodiments.

The display panel 110 may be an LCD panel.

The optical sheet 120 may transfer light exiting the quantum dot sheet 140 to the display panel 110. A gap or an air gap may be formed between the optical sheet 120 and the quantum dot sheet 140.

The quantum dot sheet 140 may receive light exiting the light guide plate 160, and selectively change a color of the received light. In the quantum dot sheet 140, a plurality of quantum dots may be distributed to change a color of the light.

Light emitted from the light source 180 or light exiting the color transforming element 150 may be incident to the light guide plate 160. Light inside the light guide plate 160 may be reflected one or more times, and then emitted toward the quantum dot sheet 140. The light guide plate 160 may be made of a synthetic resin, such as PMMA or Poly Methylstrene.

The reflector 170 may be disposed below a reflective surface 163 of the light guide plate 160, and reflect light from at the reflective surface 163 back to the inside of the light guide plate 160. The reflector 170 may be made of PET or PC.

The light source 180 may emit light of a predetermined color such as blue. A part of light emitted by the light source 180 may arrive directly at the incident surface 161 of the light guide plate 160, may be reflected by an auxiliary reflector 182 or the reflector 170 and then arrive at the incident surface 161 of the light guide plate 160, or may arrive at the color transforming element 150. Also, a part of light emitted from the light source 180 may be absorbed in the first light absorbing element 151. The light source 180 may be an LED.

The light source 180 may be mounted on the PCB 181. On the PCB 181, a semiconductor chip and a circuit for controlling light emission of the light source 180 may be mounted. The PCB 181 may control various operations of the display apparatus 100g.

The spacer 190 may be interposed between the PCB 181 and the reflector 170 so that the reflector 170 and elements mounted on the PCB 181 are prevented from damaging each other.

The housing 130a may include a color transforming element installing part 137 in which the color transforming element 150 is installed. The color transforming element installing part 137 may be formed to face the PCB 181, and may include an installation area in which the color transforming element 150 can be installed. The color transforming element installing part 137 may have a shape protruding in a direction in which the display panel 110 is disposed. The color transforming element installing part 137 may have a shape which is different from that of the first fixing part 131 that is interposed between the optical sheet 120 and the quantum dot sheet 140. In other words, the upper or lower surface of the color transforming element installing part 137 may neither contact nor be disposed directly adjacent to the optical sheet 120 and the quantum dot sheet 140. Accordingly, the color transforming element installing part 137 may not provide a function of securing the optical sheet 120 or the quantum dot sheet 140.

The color transforming element 150 installed in the color transforming element installing part 137 may emit exit light of a color that is different from that of incident light, as described above. According to an exemplary embodiment, the color transforming element 150 may include a fluorescent material. One surface of the color transforming element 150 may contact the light guide plate 160.

In the color transforming element installing part 137, a first light absorbing element 151 may be further disposed. According to an exemplary embodiment, the first light absorbing element 151 may be disposed alongside the color transforming element 150 in the color transforming element installing part 137, as shown in FIG. 7 and FIG. 12. According to another exemplary embodiment, the first light absorbing element 151 may contact the rear surface of the color transforming element 150, as shown in FIGS. 8 and 11. The first light absorbing element 151 may be made of a material that can absorb light. More specifically, the first light absorbing element 151 may include a black material, such as a black dye or a black strip.

An auxiliary reflector 182 may be provided in the inner surface of the housing 130a. The auxiliary reflector 182 may include a plurality of auxiliary reflectors 182a and 182b disposed at different locations. The plurality of auxiliary reflectors 182a and 182b may reflect light with different emission angles at different locations to transfer the reflected light toward the color transforming element 150, the first light absorbing element 151, or the light guide plate 160.

A second fixing part 138 with a second structure may be provided in the upper portion of the housing 130a to secure the display panel 110, the optical sheet 120, and the quantum dot sheet 140. The second fixing part 138 with the second structure may have a shape protruding from the housing 130a in a direction in which the display panel 110 is located. The second fixing part 138 with the second structure may protrude further than the color transforming element installing part 137. The second fixing part 138 with the second structure may press the display panel 110 from above to stably secure the display panel 110, the optical sheet 120, and the quantum dot sheet 140.

Figure 13:
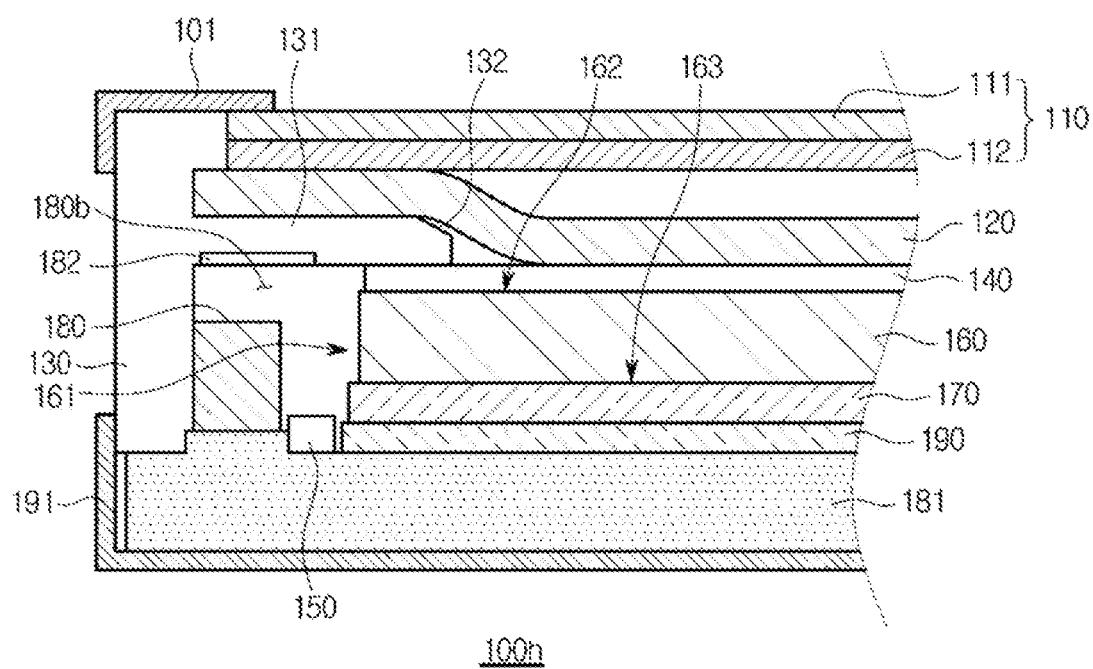
FIG. 13 is a cross-sectional view of a display apparatus according to an eighth exemplary embodiment.

Hereinafter, a display apparatus according to an eighth exemplary embodiment will be described with reference to FIG. 13. FIG. 13 is a cross-sectional view of a display apparatus according to an eighth exemplary embodiment.

Referring to FIG. 13, a display apparatus 100h may include an upper housing, a display panel 110, an optical sheet 120, a quantum dot sheet 140, a light guide plate 160, a reflector 170, a spacer 190, a PCB 181, a light source 180, a middle housing 130, a first fixing part 131, and a color transforming element 150. However, one or more of the aforementioned components may be omitted according to the one or more exemplary embodiments.

The display panel 110 may be one of various kinds of display panels, such as an LCD panel, including a thin film transistor board 111 and a color display board 112.

The optical sheet 120 may transfer light exiting the quantum dot sheet 140 to the display panel 110.

The quantum dot sheet 140 may receive light exiting the light guide plate 160, and selectively change a color of the received light. In the quantum dot sheet 140, a plurality of quantum dots may be distributed to change a color of light.

The light guide plate 160 may receive light emitted from the light source 180 or light exiting the color transforming element 150 through an incident surface 161 facing the light source 180. Light emitted from the light source 180 or light exiting the color transforming element 150 may enter the light guide plate 180 through an exit surface 162 of the light guide plate 160, and then be reflected one or more times inside the light guide plate 160. The incident light may be emitted toward the quantum dot sheet 140 through the exit surface 162. The light guide plate 160 may be made of a synthetic resin, such as PMMA or Poly Methylstrene.

The reflector 170 may be disposed below a reflective surface 163 of the light guide plate 160, and reflect light from the reflective surface 163 back to the inside of the light guide plate 160. The reflector 170 may be made of PET or PC.

The light source 180 may emit light of a predetermined color, such as blue. A part of light emitted from the light source 180 may directly arrive at the incident surface 161 of the light guide plate 160, may be reflected by the reflector 170 or the auxiliary reflector 182 and then arrive at the incident surface 161, or may arrive at the color transforming element 150. The light source 180 may be an LED.

The light source 180 may be mounted on the PCB 181. A semiconductor chip and a circuit for controlling light emission of the light source 180 may be mounted on the PCB 181. The PCB 181 may control various operations of the display apparatus 100h.

The spacer 190 may be interposed between the PCB 181 and the reflector 170 so that elements mounted on the PCB 181 and the reflector 170 are prevented from damaging each other The first fixing part 131 may protrude from the middle housing 130 in a direction in which the optical sheet 120 and the quantum dot sheet 140 are disposed. The first fixing part 131 may secure the quantum dot sheet 140, etc. The upper surface of the first fixing part 131 may face the lower surface of the optical sheet 120, and the lower surface of the first fixing part 131 may face the upper surface of the quantum dot sheet 140.

The upper housing 101 may be disposed around the edges of the display panel 110 to secure the display panel 110. The upper housing 101 may include a second fixing part 103 (see FIG. 2).

The color transforming element 150 may emit exit light of a color that is different from that of incident light, to space 180b. According to an embodiment, the color transforming element 150 may include a fluorescent material. The color transforming element 150 may be mounted on the PCB 181 or the spacer 190, as shown in FIG. 13. The color transforming element 150 may receive light emitted from the light source 180 to the PCB 181 or the spacer 190, change a color of the received light, and emit the light with the changed color. The entirety or a part of one surface of the color transforming element 150 may be exposed to the space 180b in which the light source 180 is installed.

As shown in FIG. 7, a first light absorbing element 151 may be disposed alongside the color transforming element 150. Also, as shown in FIG. 8, a first light absorbing element 151 may be interposed between the color transforming element 150 and the first fixing part 131.

Figure 14:
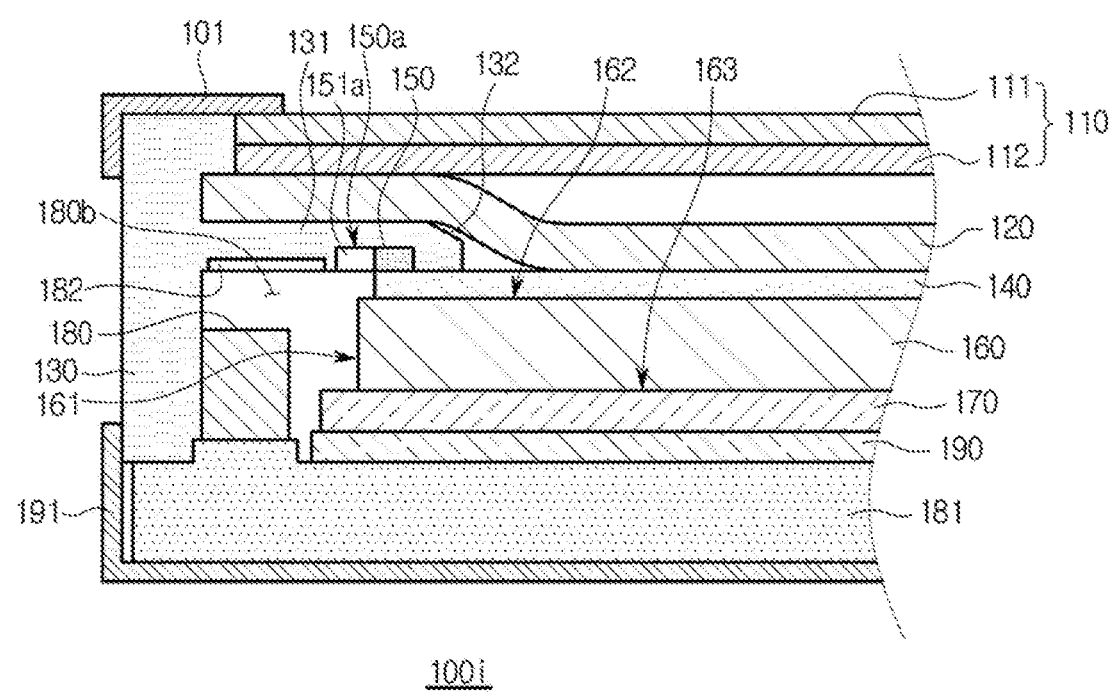
FIG. 14 is a cross-sectional view of a display apparatus according to a ninth exemplary embodiment.

Hereinafter, a display apparatus according to a ninth exemplary embodiment will be described with reference to FIG. 14. FIG. 14 is a cross-sectional view of a display apparatus according to a ninth exemplary embodiment.

Referring to FIG. 14, a display apparatus 100i may include an upper housing 101, a display panel 110, an optical sheet 120, a quantum dot sheet 140, a light guide plate 160, a reflector 170, a spacer 190, a PCB 181, a light source 180, a middle housing 130, a first fixing part 131, and a color transforming element 150, and may further include an auxiliary reflector 151a disposed around the color transforming element 150. However, one or more of the aforementioned components may be omitted according to one or more exemplary embodiments.

The upper housing 101, the display panel 110, the optical sheet 120, the quantum dot sheet 140, the light guide plate 160, the reflector 170, the spacer 190, the PCB 181, the light source 180, the middle housing 130, the first fixing part 131, and the color transforming element 150 may be the substantially similar components as those described above with reference to other exemplary embodiments, and accordingly, detailed descriptions therefor will be omitted.

According to an exemplary embodiment, the auxiliary reflector 151a may be disposed alongside the color transforming element 150, as shown in FIG. 14. The auxiliary reflector 151a may be disposed closer to the light source 180 than the color transforming element 150, and the color transforming element 150 may be closer to the quantum dot sheet 140 or the light guide plate 160.

The auxiliary reflector 151a may reflect light emitted from the light source 180 and not entering the light guide plate 160, toward the light guide plate 160. The light reflected by the auxiliary reflector 151a may be directly or indirectly incident to the light guide plate 160. Accordingly, the auxiliary reflector 151a may prevent leakage of light emitted from the light source 180.

The auxiliary reflector 151a may include a white material. The white material may include at least one of a dye applied on the lower surface of the first fixing part 131, a white strip attached below the first fixing part 131, and a reflecting mirror. Also, the auxiliary reflector 151a may be one of various structures that can be used to reflect light.

Hereinafter, a display apparatus according to a tenth exemplary embodiment will be described with reference to FIGS. 15 to 18.

Figure 15:
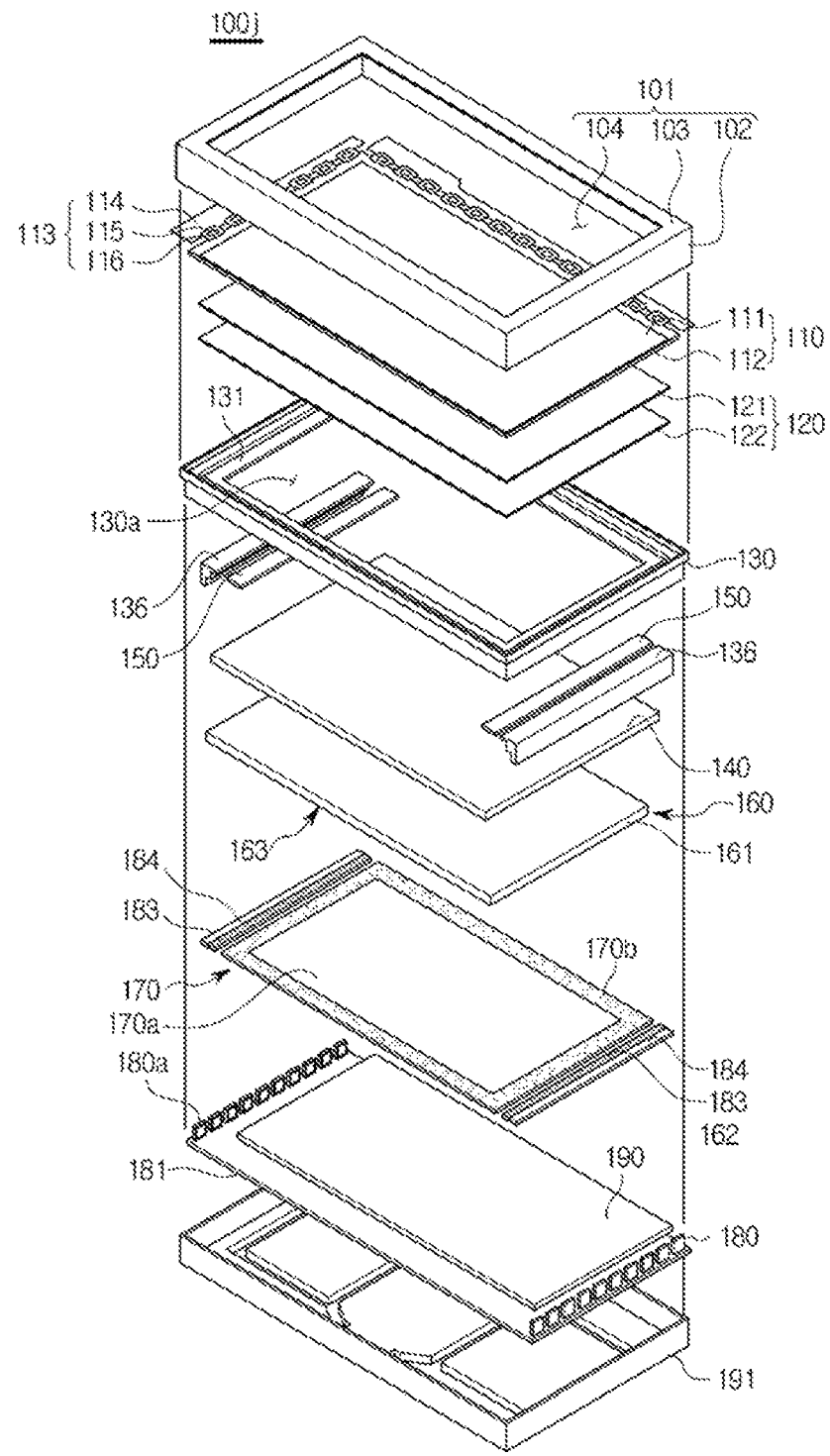
FIG. 15 is an exploded perspective view of a display apparatus according to a tenth exemplary embodiment.
Figure 16:
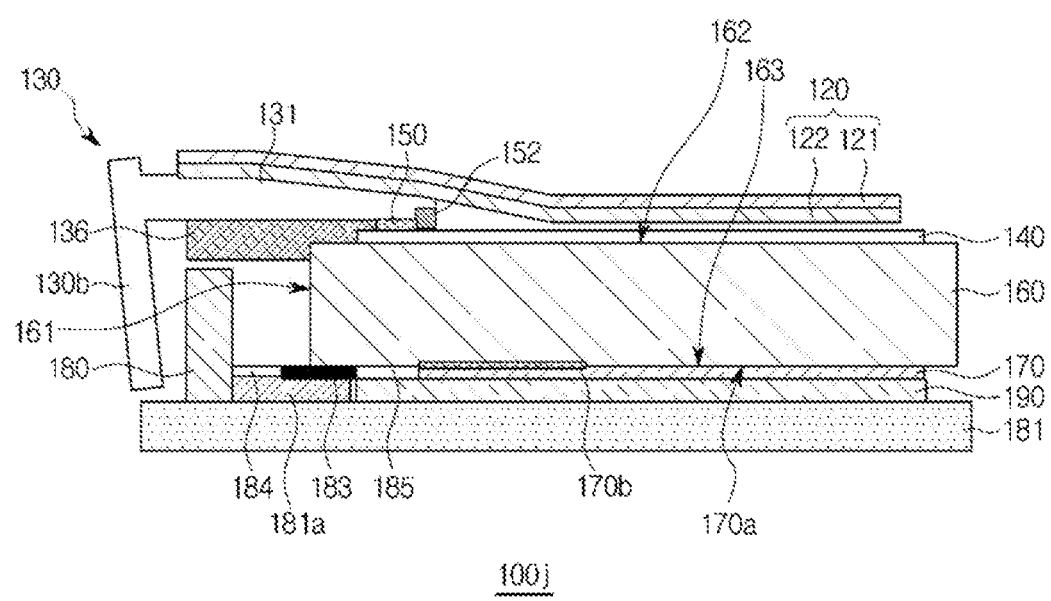
FIG. 16 is a cross-sectional view of the display apparatus according to the tenth exemplary embodiment.

FIG. 15 is an exploded perspective view of a display apparatus according to a tenth exemplary embodiment, and FIG. 16 is a cross-sectional view of the display apparatus according to the tenth exemplary embodiment.

Referring to FIGS. 15 and 16, a display apparatus 100j may include an upper housing 101, a display panel 110, an optical sheet 120, a middle housing 130, a light leakage preventing element 136, i.e., a light leakage preventer, a quantum dot sheet 140, a color transforming element 150, a light guide plate 160, a reflector 170, a plurality of light sources 180 and 180a, a PCB 181, a spacer 190, and a lower housing 191. However, one or more of the aforementioned components may be omitted according to one or more exemplary embodiments.

The upper housing 101 may be disposed on the display panel 110 to form a front appearance of the display apparatus 100*j*. The upper housing 101 may secure various elements of the display apparatus 100, and protect the elements of the display apparatus 100 from external impact.

The upper housing 101 may include a second fixing part 103 forming a bezel, and an upper housing side part 102 extending from the edges of the second fixing part 103 toward the lower housing 191. In the front part of the upper housing 101, an opening 104 may be formed so that a display area of the display panel 110 can be exposed to the outside.

The upper housing 101 may be omitted. The upper housing 101 may be integrated into at least one of the middle housing 130 and the lower housing 191.

The display panel 110 may receive light supplied through the optical sheet 120, and output the received light. One surface of the display panel 110 may be exposed to outside of the display apparatus 100 by the opening 104.

The display panel 110 may be an LCD.

According to an exemplary embodiment, the display panel 110 may further include a thin film transistor board 111 on which a plurality of thin film transistors are arranged, and a color display board 112, and a liquid crystal layer provided between the thin film transistor board 111 and the color display board 112.

If the display panel 110 includes the thin film transistor board 111 and the color display board 112, the thin film transistor board 111 and the color display board 112 may be spaced by a predetermined distance apart from each other. A color filter and a black matrix may be provided on the color display board 112. On the thin film transistor board 111, a driver 113 for applying a driving signal to the thin film transistor board 111 may be mounted. The driver 113 may include a first board 114, a plurality of driving chips 115 connected to the first board 114, and a second board 116 on which the driving chips 115 are mounted. The second board 116 may be a FPCB.

However, this is merely an example and the display panel 110 may be various kinds of panel that would be known by a person of ordinary skill in the art.

The display panel 110 may further include a touch panel or a polarizing plate, as necessary.

The optical sheet 120 may be mounted on the other surface of the display panel 110 that is opposite the direction of the display panel 110. The optical sheet 120 may include a plurality of films, and the plurality of films may include a protection film 121 and a prism film 122. However, according to another exemplary embodiment, at least one of the protection film 121 and the prism film 122 may be omitted.

A gap may be formed between the optical sheet 120 and the quantum dot sheet 140.

The middle housing 130 in which the display panel 110 and the optical sheet 120 are rested may secure elements such as the quantum dot sheet 140.

The middle housing 130 may include a first fixing part 131 protruding inwardly. The first fixing part 131 may define an opening 130*a* through which light exiting the quantum dot sheet 140 passes. A part of the optical sheet 120 may be rested on the upper surface of the first fixing part 131, as shown in FIG. 16.

According to an exemplary embodiment, the middle housing 130 may contact or be disposed adjacent to the quantum dot sheet 140 with the color transforming element 150 or with the light leakage preventing element 136 in between, to secure the quantum dot sheet 140.

According to another exemplary embodiment, the middle housing 130 may contact the light guide plate 160 or be disposed adjacent to the light guide plate 160 with the color transforming element 150 or the light leakage preventing element 136 in between, to secure the light guide plate 160.

According to still another exemplary embodiment, the middle housing 130 may secure both the quantum dot sheet 140 and the light guide plate 160.

The middle housing 130 may include the first fixing part 131, and the first fixing part 131 may protrude from the middle housing 130 toward the optical sheet 120 and the quantum dot sheet 140. On the upper surface of the first fixing part 131 facing the display panel 110, the optical sheet 120 may be disposed, and below the rear surface of the first fixing part 131, the quantum dot sheet 140 and the light guide plate 160 may be disposed. The first fixing part 131 may be inserted between the optical sheet 120 and the quantum dot sheet 140 or between the optical sheet 120 and the light guide plate 160. The first fixing part 131 may contact the optical sheet 120 or the quantum dot sheet 140, or may be attached to the optical sheet 120 or the quantum dot sheet 140 using an adhesive.

The middle housing 130 may include the color transforming element 150. For example, the color transforming element 150 may be provided on one surface of the first fixing part 131 of the middle housing 130. On a side of the color transforming element 150 adjacent to the opening 130*a* of the middle housing 130, an attachment element 152 of the middle housing 130 may be provided, and on the other side of the color transforming element 150, a light leakage preventing element 136 may be provided.

The color transforming element 150 may emit exit light of a color that is different from that of incident light emitted by the light source 180 and then incident to the color transforming element 150, as described above.

The attachment element 152 may protrude from the first fixing part 131 of the middle housing 130 toward the quantum dot sheet 140, and secure the quantum dot sheet 140. The attachment element 152 may be integrated into the first fixing part 131, or may be fabricated separately and disposed on one edge surface of the first fixing part 131 facing toward the lower housing 191.

Also, the middle housing 130 may further include a light leakage preventing element 136. The light leakage preventing element 136 may prevent light emitted from the light source 180 or the light guide plate 160 from leaking out of the display apparatus 100. Also, the light leakage preventing element 136 may enable the quantum dot sheet 140, the light guide plate 160, and the first fixing part 131 to be coupled without being damaged by each other.

The light leakage preventing element 136 may be disposed below the first fixing part 131 of the middle housing 130. More specifically, the light leakage preventing element 136 may be disposed on one surface of the first fixing part 131 facing toward the lower housing 191.

The light leakage preventing element 136 may be disposed alongside the color transforming element 150, more specifically, between the color transforming element 150 and the outer frame 130*b* of the middle housing 130. The light leakage preventing element 136 may contact the color transforming element 150, or may be spaced apart from the color transforming element 150 on the lower surface of the first fixing part 131.

The light leakage preventing element 136 may be made of a flexible material that is deformable according to an external force. For example, the light leakage preventing element 136 may be made of natural rubber or a synthetic resin. The light leakage preventing element 136 may be made of sponge.

As shown in FIG. 16, the light leakage preventing element 136 may have a stepwise structure when all components are coupled. If the light leakage preventing element 136 has a stepwise structure, the light leakage preventing element 136 may contact at least one of the quantum dot sheet 140 and the light guide plate 160, or extend over both the quantum dot sheet 140 and the light guide plate 160.

Figure 17:
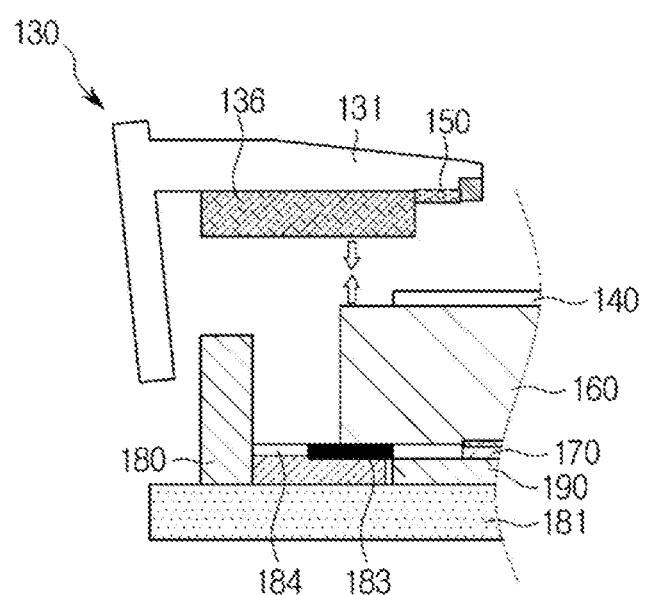
FIGS. 17 and 18 are views describing the display apparatus according to the tenth exemplary embodiment.
Figure 18:
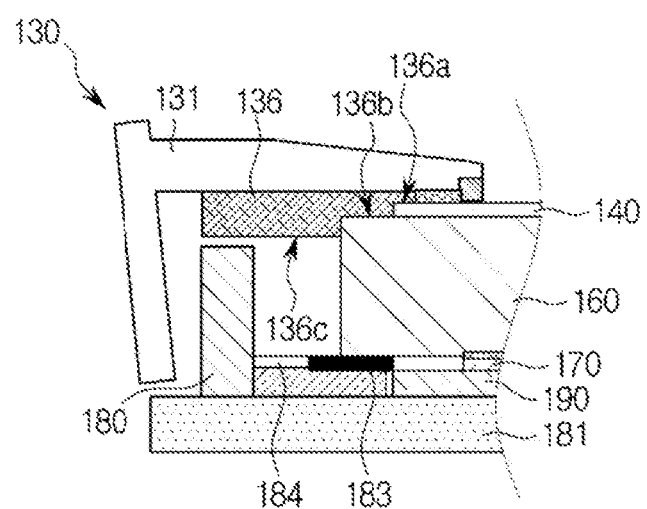

FIGS. 17 and 18 are views for describing the light leakage preventing element 136 in the display apparatus 100*j* according to the tenth exemplary embodiment.

As described above, the light leakage preventing element 136 may be a member made of a flexible material, such as sponge, that is deformable according to an external force. In this case, the light leakage preventing element 136 may form a stepwise structure between the first fixing part 131 and the light guide plate 160 or between the first fixing part 131 and the quantum dot sheet 140.

As shown in FIG. 17, the light leakage preventing element 136 may be attached on the lower surface of the first fixing part 131. At this time, the light leakage preventing element 136 may be in the shape of a hexahedron since it is not compressed. However, the light leakage preventing element 136 may have another shape according to one or more exemplary embodiments. Then, the first fixing part 131 approaches the light guide plate 160 on which the quantum dot sheet 140 is mounted, and may contact the quantum dot sheet 140 and the light guide plate 160, as shown in FIG. 18.

As the first fixing part 131 approaches closer to the light guide plate 160, the light leakage preventing element 136 may be compressed by the force, making the first fixing part 131 approach the light guide plate 160. Then, the light leakage preventing element 136 may be deformed to a shape corresponding to the arrangement of the quantum dot sheet 140 and the light guide plate 160. For example, since the quantum dot sheet 140 and the light guide plate 160 are arranged stepwise as shown in FIGS. 17 and 18, the light leakage preventing element 136 may be deformed to a stepwise structure.

Accordingly, the light leakage preventing element 136 may have a stepwise structure contacting at least one of the quantum dot sheet 140 and the light guide plate 160. Accordingly, an area 136*a* of one surface of the light leakage preventing element 136 may contact the quantum dot sheet 140, and the other area 136*b* of the light leakage preventing element 136 may contact the light guide plate 160. Meanwhile, another area 136*c* of the surface of the light leakage preventing element 136 may be exposed to space formed between the light leakage preventing element 160 and the light source 180.

The quantum dot sheet 140 may transfer light emitted from the light leakage preventing element 160 to the optical sheet 120. The quantum dot sheet 140 may selectively change a wavelength of light exiting the light guide plate 160 to change a color of the light.

A gap with a predetermined height may be formed between the quantum dot sheet 140 and the optical sheet 120, and light exiting the quantum dot sheet 140 may be reflected one or more times in the gap between the quantum dot sheet 140 and the optical sheet 120. Whenever light is reflected in the gap between the quantum dot sheet 140 and the optical sheet 120, the color of the light may be changed by the quantum dots.

The color transforming element 150 may emit exit light of a color that is different from that of the light emitted by the light source and then incident to the color transforming element 150. The color transforming element 150 may change a color of incident light while the incident light is reflected or transmitted by the color transforming element 150.

For example, the color transforming element 150 may emit light in response to stimulation of incident light, and change a wavelength of the incident light to emit exit light of a color that is different from that of the incident light. According to an exemplary embodiment, the color transforming element 150 may emit light having a wavelength that is longer than that of incident light.

Light emitted from the color transforming element 150 may be incident to at least one of the light guide plate 160 and the quantum dot sheet 140. The light emitted from the color transforming element 150 may be incident directly to the light guide plate 160 or the quantum dot sheet 140, or indirectly to the light guide plate 160 or the quantum dot sheet 140 through another medium such as the reflector 170. Light emitted from the color transforming element 150 may be incident to the light guide plate 160 according to a position of the color transforming element 150 or a shape of an area in which the color transforming element 150 is positioned.

The color transforming element 150 may include a fluorescent material. The fluorescent material may be a fluorescent material that can be applied to the middle housing 130, or a fluorescent strip that can be attached to the middle housing 130.

The light guide plate 160 may face the optical sheet 120 with the quantum dot sheet 140 in between. The light guide plate 160 may receive light emitted from the light source 180, and internally reflect the light one or more times so that light may be more uniformly supplied to the quantum dot sheet 140. The light guide plate 160 may include an incident surface 161 corresponding to one lateral side of the light guide plate 160 to which light emitted from the light source 180 is incident, an exit surface 162 contacting the quantum dot sheet 140, and a reflective surface 163 that is opposite to the exit surface 162. Light emitted from the light source 180 or the color transforming element 150 may be incident to the incident surface 161 of the light guide plate 160.

The reflector 170 may be disposed below the reflective surface 163 of the light guide plate 160. The reflector 170 may reflect light from the reflective surface 163 of the light guide plate 160 back to the inside of the light guide plate 160.

According to an exemplary embodiment, a second light absorbing element 183 may be disposed alongside the reflector 170. The second light absorbing element 183 may absorb light emitted from the light source 180, emitted from the color transforming element 150, or reflected into the space defined by the middle housing 130.

The second light absorbing element 183 may contact the light guide plate 160. In order for the second light absorbing element 183 to contact the light guide plate 160, the second light absorbing element 183 may be disposed on one surface of a protrusion 181*a* protruding from the PCB 181. The second light absorbing element 183 may be exposed to an air gap between the light source 180 and the light guide plate 160. Also, the second light absorbing element 183 may be spaced by a predetermined distance apart from the reflector 170. Accordingly, an air gap 185 may be formed between the light guide plate 160, the reflector 170, and the second light absorbing element 183.

According to another exemplary embodiment, an auxiliary reflector 184 may be further provided alongside the reflector 170 to reflect incident light. The auxiliary reflector 184 may also be disposed on the protrusion 181a protruding from the PCB 181, and exposed to the air gap between the light source 180 and the light guide plate 160, like the second light absorbing element 183.

According to an exemplary embodiment, both the second light absorbing element 183 and the auxiliary reflector 184 may be disposed alongside the reflector 170. In this case, the auxiliary reflector 184 may be disposed adjacent to the light source 180, and the second light absorbing element 183 may be between the auxiliary reflector 184 and the reflector 170. The second light absorbing element 183 and the auxiliary reflector 184 may contact each other.

According to an exemplary embodiment, a fluorescent material 170b may be formed on one surface 170a of the reflector 170. The fluorescent material 170b may be at least one of a dye applied to the surface 170a of the reflector 170 and a fluorescent strip attached to the surface 170a of the reflector 170.

The fluorescent material 170b applied on the reflector 170 may prevent a color of a displayed image from becoming different from an intended color, when light emitted from the light source 180 is less reflected between the reflector 170 and the quantum dot sheet 140.

Since the fluorescent material 170b is applied or attached to the surface 170a of the reflector 170, the fluorescent material 170b may be disposed between the light guide plate 160 and the reflector 170, as shown in FIG. 16.

The fluorescent material 170b may be formed with a predetermined pattern on the surface 170a of the reflector 170, and the predetermined pattern may be based on changing density and concentration of the florescent material 170b. The fluorescent material 170b may be applied or attached to the surface 170a of the reflector 170 alongside the edges of the surface 170a of the reflector 170, as shown in FIG. 15.

The spacer 190 may be disposed below the reflector 170, and the spacer 190 may be attached to the surface of the reflector 170 that is opposite the surface of the reflector 170 contacting the light guide plate 160.

The spacer 190 may prevent various elements mounted on the PCB 181 and protruding in one direction from directly contacting the reflector 170 so that the elements and the reflector 170 are not damaged.

The PCB 181 may be disposed below the spacer 190. The PCB 181 may be attached to the surface of the spacer 190 on which the reflector 170 is not attached.

The PCB 181 may apply an electrical signal to the light source 180 so that the light source 180 can emit light of various colors. On the PCB 181, various elements may be mounted to control light emission of the light source 180 or various operations of the display apparatus 100j.

The light source 180 may emit light of a predetermined color in all directions. The light source 180 may be mounted on one or more edges of the PCB 181 in order to emit light of a predetermined color toward the light guide plate 160. If a plurality of light sources 180 and 180a are mounted on two edges of the PCB 181, the plurality of light sources 180 mounted a first edge of the PCB 181 may face the plurality of light sources 180a mounted on a second edge of the PCB 181. According to an exemplary embodiment, the light source 180 may be mounted directly on the PCB 181, or mounted on a rest separately provided on the PCB 181.

The lower housing 191 may be connected to at least one of the upper housing 101 and the middle housing 130 to form an external appearance of the display apparatus 100.

At least two of the upper housing 101, the middle housing 130, and the lower housing 191 may be integrated into one body. For example, the middle housing 130 may be a portion of the lower housing 191 or a portion of the upper housing 101.

Figure 19:
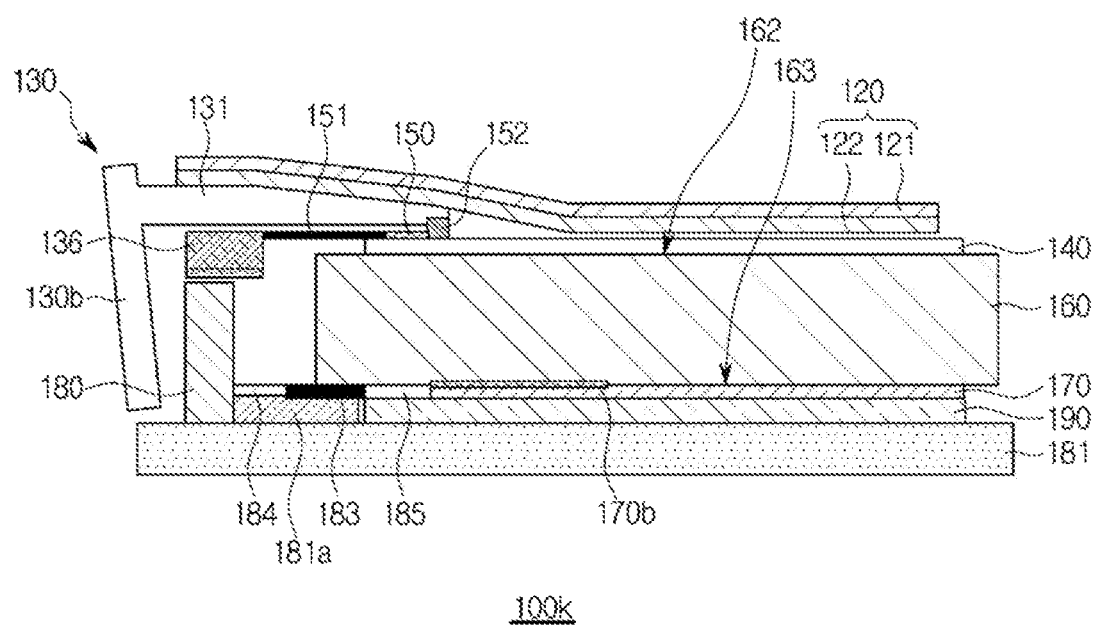
FIG. 19 is a cross-sectional view of a display apparatus according to an eleventh exemplary embodiment.

Hereinafter, a display apparatus according to an eleventh exemplary embodiment will be described with reference to FIG. 19. FIG. 19 is a cross-sectional view of a display apparatus according to an eleventh exemplary embodiment. In FIG. 19, for convenience of description, the upper housing 101, the display panel 110, and the lower housing 191 are not shown, and other elements may be added without departing from the scope of the teaching of FIG. 19.

Referring to FIG. 19, a display apparatus 100k may include an optical sheet 120, a quantum dot sheet 140, a light guide plate 160, a reflector 170, a PCB 181, a light source 180, a middle housing 130, a first fixing part 131, a color transforming element 150, a first light absorbing element 151, and a light leakage preventing element 136. However, one or more of the aforementioned components may be omitted according to one or more exemplary embodiments.

The optical sheet 120, the middle housing 130, the quantum dot sheet 140, the light guide plate 160, the reflector 170, the PCB 181, the light source 180, and the spacer 190 may be similar to the components described above with reference to exemplary embodiments, and accordingly, detailed descriptions therefor will be omitted.

According to the eleventh exemplary embodiment, the first fixing part 131 may protrude from the middle housing 130 toward the optical sheet 120 and the quantum dot sheet 140. The color transforming element 150, the first light absorbing element 151, and the light leakage preventing element 136 may be disposed below the first fixing part 131. Also, an attachment element 152 may be disposed on the edge of the first fixing part 131 facing toward space 130a. In this case, in one side of the attachment element 152, the color transforming element 150, the first light absorbing element 151, and the light leakage preventing element 136 may be positioned in this order.

The attachment element 152 may protrude from the first fixing part 131 of the middle housing 130 toward the quantum dot sheet 140 to secure the quantum dot sheet 140. The attachment element 152 may be integrated into the first fixing part 131, or fabricated as a separate element and then attached to an edge of a surface of the first fixing part 131 facing toward the lower housing 191.

The color transforming element 150 may emit light of a color that is different from that of incident light emitted by the light source 180, as described above. The color transforming element 150 may be disposed on one surface of the first fixing part 131 near the quantum dot sheet 140 or the light guide plate 160.

The first light absorbing element 151 may be disposed alongside the color transforming element 150.

The first light absorbing element 151 may absorb a part of light emitted from the light source 180. More specifically, the first light absorbing element 151 may absorb light with a predetermined incident angle among light emitted from the light source 180 so that light with an incident angle that is within a predetermined angle range can be incident to the color transforming element 150 or the light guide plate 160.

As shown in FIG. 19, the first light absorbing element 151 may be disposed on a surface of the first fixing part 131 below the first fixing part 131.

The light leakage preventing element 136 may prevent light emitted from the light source 180 or the light guide plate 160 from leaking out.

The light leakage preventing element 136 may be disposed below the first fixing part 131 of the middle housing 130, more specifically, on one surface of the first fixing part 131 facing toward the lower housing 191.

The light leakage preventing element 136 may be disposed alongside the first light absorbing element 151, as shown in FIG. 19. More specifically, the light leakage preventing element 136 may be disposed between the first light absorbing element 151 and the outer frame 130b of the middle housing 130. The light leakage preventing element 136 may contact the first light absorbing element 151.

The light leakage preventing element 136 may be made of a flexible material that is deformable according to an external force. For example, the light leakage preventing element 136 may be made of natural rubber or a synthetic resin. The light leakage preventing element 136 may be sponge.

Meanwhile, in the eleventh exemplary embodiment, the light leakage preventing element 136 may be in the shape of a hexahedron. In other words, the light leakage preventing element 136 of the eleventh embodiment may have no stepwise structure, unlike in the tenth exemplary embodiment. However, the light leakage preventing element 136 may have any other structure, such as a cylinder or a prism, according to one or more exemplary embodiments.

The light leakage preventing element 136 of the eleventh exemplary embodiment may contact neither the quantum dot sheet 140 nor the light guide plate 160, and be exposed to space formed between the light guide plate 160 and the light source 180, as shown in FIG. 19. In other words, the light leakage preventing element 136 may contact only the first fixing part 131.

The light leakage preventing element 136 may be spaced by a predetermined distance apart from the light source 180, as shown in FIG. 19.

The display apparatuses 100a to 100k according to the first to eleventh exemplary embodiments to which the display assembly 1 is applied have been described, however, a display apparatus to which the display assembly 1 can be applied is not limited to the display apparatuses 100a to 100k according to the first to eleventh exemplary embodiments. Also, some of the configurations as described above may be arbitrarily modified according to a design choice. Also, a configuration disclosed in any one of the first to eleventh exemplary embodiments may be applied as it is, or modified and applied to the remaining embodiments, unless necessarily contradictory.

The display assembly 1 and the display apparatus 100 including the same may be ones of various apparatuses with a display. For example, the display apparatus 100 may be a television, a computer, a monitor of machinery, an electronic board, or any other apparatus, which can emit light and provide a predetermined screen according to a user's manipulation or a predetermined setting. As another example, the display apparatus 100 may be a portable display apparatus, such as a cellular phone, a smart phone, a tablet PC, a laptop computer, or Personal Digital Assistance (PDA). Also, the display apparatus 100 may be one of various kinds of display devices that can be considered by a person of ordinary skill in the art.

One aspect of one or more exemplary embodiments according to the display assembly and the display apparatus using the same, as described above, is to improve color uniformity of a display screen.

One aspect of one or more exemplary embodiments according to the display assembly and the display apparatus using the same, as described above, is to represent a color of an edge area adjacent to the light source as an intended color in a display screen.

One aspect of one or more exemplary embodiments according to the display assembly and the display apparatus using the same, as described above, is to prevent a color of an edge area adjacent to the light source from being represented differently from an intended color in a display screen, for example, to prevent a color of the edge area from becoming blue differently from an intended color.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A display apparatus comprising: a quantum dot sheet;
a light guide plate to which light irradiated from a light source is incident at a lateral side, a first surface of the light guide plate contacting a first surface of the quantum dot sheet;
a reflector disposed on a second surface of the light guide plate opposite to the first surface of the light guide plate, and configured to reflect light incident to the light guide plate to the inside of the light guide plate;
a fluorescent material provided between the light guide plate and the reflector and formed on a surface of the reflector in such a way to be applied or attached along an edge of the surface of the reflector; and
a light leakage preventing element configured to prevent light irradiated from the light source from leaking to the outside, a first portion of the light leakage preventing element being exposed to a space between the light source and the light guide plate,
wherein the light leakage preventing element is disposed in contact with the quantum dot sheet and the light guide plate through a stepwise structure,
wherein a thickness of the first portion of the light leakage preventing element is greater than a thickness of a second portion that contacts the first surface of the light guide plate.

2. The display apparatus according to claim 1, wherein the light leakage preventing element is disposed between a fixing part protruding toward the quantum dot sheet and at least one of the quantum dot sheet and the light guide plate, the fixing part being configured to secure the quantum dot sheet in a housing of the display apparatus.

3. The display apparatus according to claim 1, wherein the light leakage preventing element comprises a flexible material that is deformed to form a stepwise structure when the light leakage preventing element is disposed in contact with the quantum dot sheet and the light guide plate.

4. The display apparatus according to claim 1, wherein the quantum dot sheet transfers light emitted from the light leakage preventing element to an optical sheet facing a second surface of the quantum dot sheet.

5. The display apparatus according to claim 1, wherein the fluorescent material prevents a color of a displayed image from becoming different from an intended color, when light emitted from the light source is less reflected between the reflector and the quantum dot sheet.

6. The display apparatus according to claim 1, wherein the light leakage preventing element is disposed in contact with a second surface of the quantum dot sheet opposite to the first surface of the quantum dot sheet.

7. The display apparatus according to claim 1, wherein the light leakage preventing element contacts a lateral side of the quantum dot sheet that faces the light source.

8. The display apparatus according to claim 7, wherein the light leakage preventing element contacts the lateral side of the light guide plate.

9. The display apparatus according to claim 1, wherein the light leakage preventing element comprises a sponge.

* * * * *